US007076455B1

(12) United States Patent
Fogelson

(10) Patent No.: US 7,076,455 B1
(45) Date of Patent: Jul. 11, 2006

(54) BUILDERS ON-LINE ASSISTANT

(75) Inventor: Bruce A. Fogelson, 1145 W. Montana, Chicago, IL (US) 60614

(73) Assignee: Bruce A. Fogelson, Chicago, IL (US)

( * ) Notice: Subject to any disclaimer, the term of this patent is extended or adjusted under 35 U.S.C. 154(b) by 0 days.

(21) Appl. No.: 09/483,579

(22) Filed: Jan. 14, 2000

(51) Int. Cl.
*G06F 17/60* (2006.01)

(52) U.S. Cl. .......................................... 705/27; 709/26
(58) Field of Classification Search .................. 705/4, 705/26, 27
See application file for complete search history.

(56) References Cited

U.S. PATENT DOCUMENTS

| | | | | |
|---|---|---|---|---|
| 5,053,956 A | * | 10/1991 | Donald et al. | 364/401 |
| 5,111,392 A | * | 5/1992 | Malin | 364/401 |
| 5,117,354 A | * | 5/1992 | Long et al. | 364/401 |
| 5,689,705 A | * | 11/1997 | Fino et al. | 395/617 |
| 5,732,398 A | * | 3/1998 | Tagawa | 705/5 |
| 5,752,238 A | * | 5/1998 | Dedrick | 705/14 |
| 5,825,881 A | * | 10/1998 | Colvin, Sr. | 380/24 |
| 5,852,809 A | * | 12/1998 | Abel et al. | 705/26 |
| 5,918,213 A | * | 6/1999 | Bernard et al. | 705/26 |
| 5,930,769 A | * | 7/1999 | Rose | 705/27 |
| 5,991,769 A | * | 11/1999 | Fino et al. | 707/104 |
| 6,052,669 A | * | 4/2000 | Smith et al. | 705/26 |
| 6,070,142 A | * | 5/2000 | McDonough et al. | 705/7 |
| 6,167,383 A | * | 12/2000 | Henson | 705/26 |
| 6,226,618 B1 | * | 5/2001 | Downs et al. | 705/1 |
| 6,345,258 B1 | * | 2/2002 | Pickens | 705/1 |
| 6,393,410 B1 | * | 5/2002 | Thompson | 705/37 |
| 6,539,401 B1 | * | 3/2003 | Fino et al. | 707/201 |

FOREIGN PATENT DOCUMENTS

EP 0927945 A2 * 7/1999

OTHER PUBLICATIONS

RFP Marketing Opportunities Abound At 'Design Your Dream House' Site, Internet World,, Aug. 1999.*
"John Murtaugh (Longford Homes of Nevada President) (Builder's Spotlight)", Builder, Jan. 1995.*
McKee, Jamie, "Former coleman Executive to Open Experimental Home Development", Las Vegas Business Press, Feb. 1992.*
"Growth Spurt", Builder, Feb. 1997.*
"Great American Virtual Home", Professional Builder, Jan. 1996.*
Campos, Frellie, "Potential buyers can stay home to house hunt", Pacific Business News, Mar. 1997.*
Farnsworth, Christina, "Taking Care of Business—on the Internet", Professional Builder, Oct. 1995.*
Buchannan, Leigh, "Seeing the Sites", Inc., 1997.*
ftd.com website printout.*
Wexford homes website printout.*

* cited by examiner

*Primary Examiner*—Steven B. McAllister
(74) *Attorney, Agent, or Firm*—Welsh & Katz, Ltd.

(57) ABSTRACT

A method and apparatus are provided for servicing a customer of a contractor by a third-party website provider. The method includes the steps of providing a first website by the third-party website provider for use by the customer in selecting product options for product offerings provided by the contractor, receiving from the customer through the first website a selection of an option of the options provided by the contractor and collecting a commission based upon the received selection made by the customer.

37 Claims, 31 Drawing Sheets

FIG. 6

PURCHASE OFFER

- 124 — MODEL #
- 126 — SELECTED OPTIONS
- 128 — SELECTED LOT
- 130 — TOTAL PRICE
- 132 — BUYER'S INFOMATION
  - NAME: — 142
  - ADDRESS: — 144
  - PHONE #: — 146
  - CREDIT REF: — 148
  - 150 — E-MAIL ADDR:    CF # — 152
- 134 — DEPOSIT REQUIRED    $ XXXXX.XX
- 135 — COMPLETION DATE    M/Y/D
- 136 — HOW WILL YOU SUBMIT DEPOSIT?
  - CREDIT CARD NO.
  - CHECK
- 138 — PRINT PURCHASE OFFER
- SUBMIT PURCHASE OFFER — 140

122

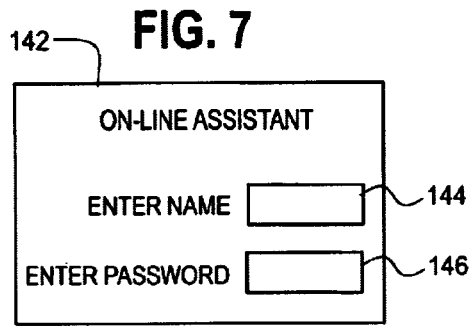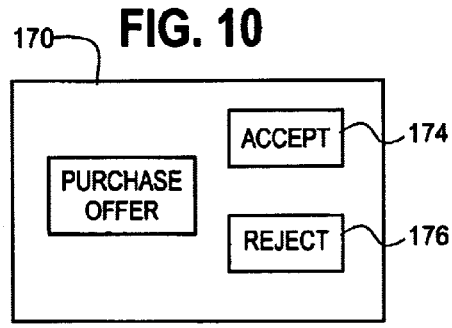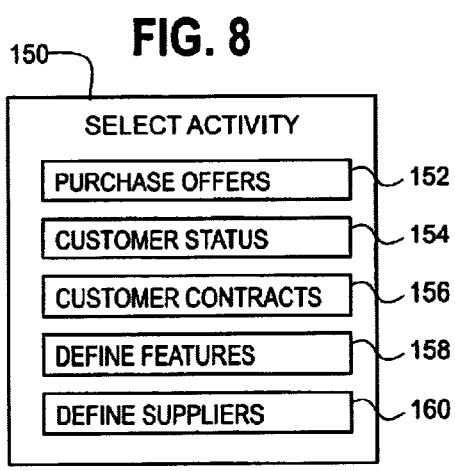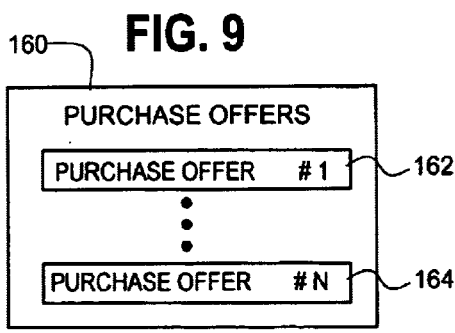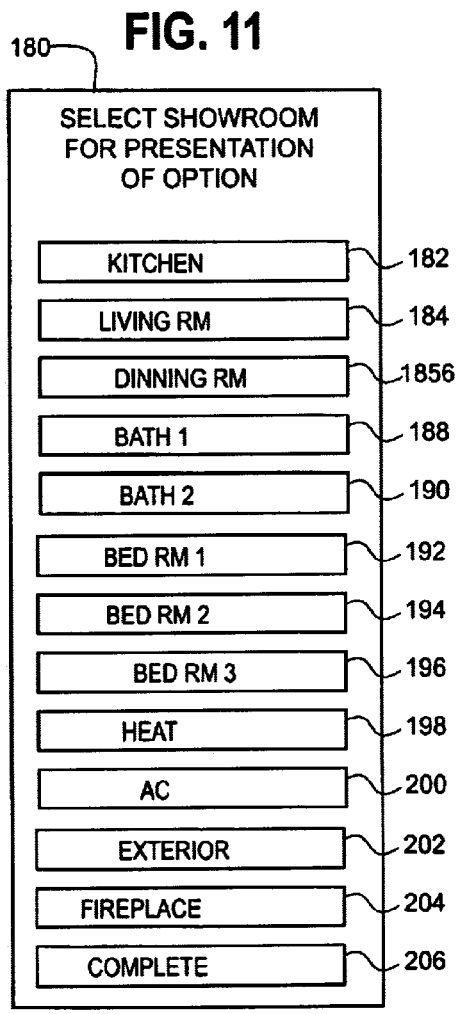

FIG. 13

| | PRICE ADDER |
|---|---|
| STANDARD FLOOR COVERING　　228 | |
| CARPET - MEDIUM GRADE - MFG #1, PROD. ID # | N/A |
| 　　BROWN ID ◁—230 | |
| 　　BLUE ID ◁— 232　　234 | |
| CARPET - MEDIUM GRADE - MFG #2, PROD. ID # | N/A |
| 　　GREEN ID ◁— 236 | |
| 　　BROWN ID ◁— 238 | |
| EXTRA　　240　242 | |
| CARPET - MEDIUM GRADE - MFG #3, PRODL ID # | $ XXX.XX |
| 　　MAUVE ID ◁— 244 | |
| 　　BROWN ID ◁— 246　249　251 | |
| CUSTOM WOOD FLOOR BY J. JONES | $ YYY.YY |

248

250

| OTHER CARPET SUPPLIER - PRESS HERE | DISCOUNT CARPET PRESS HERE |
|---|---|

226

FIG. 18
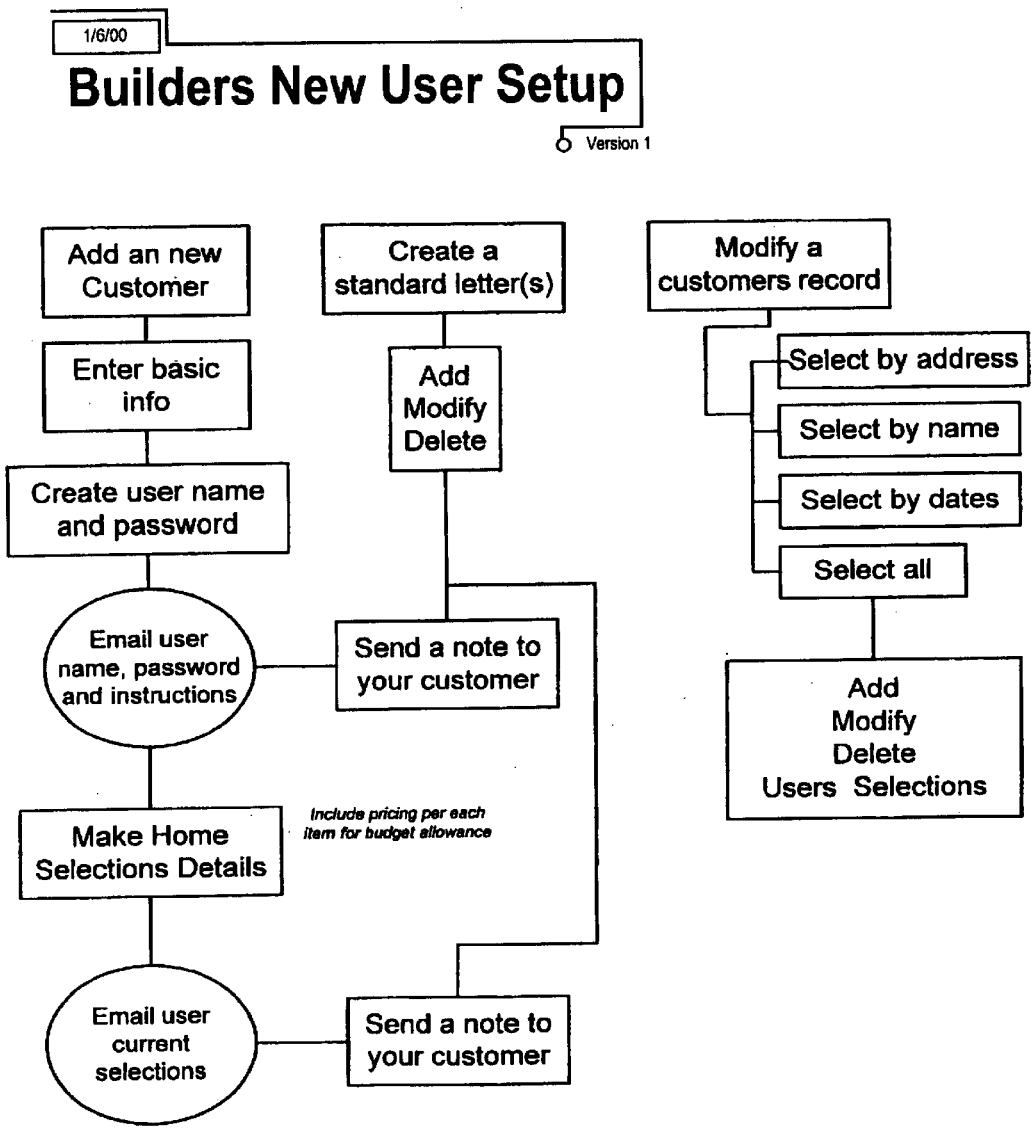
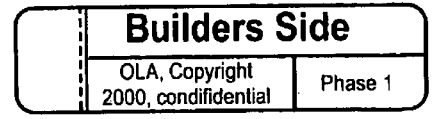

FIG. 21
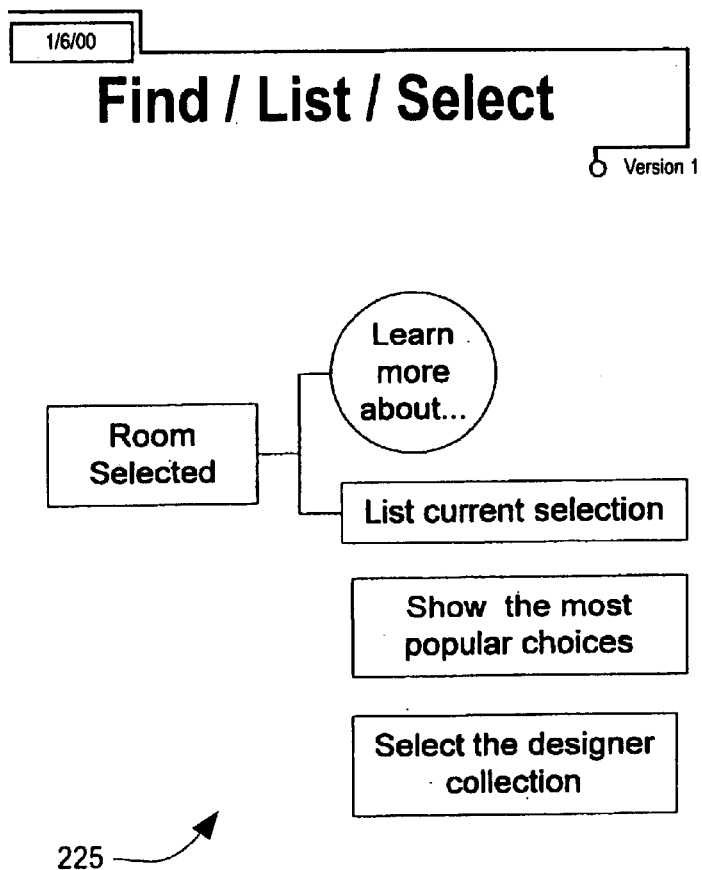
225
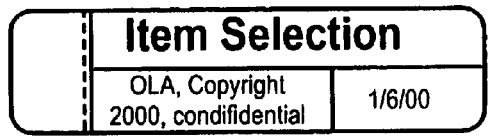

FIG. 26

Kitchen Item Selection

Home | Help | Send note to builder | See selections needed to be made | See selections need by date

| Kitchen |
|---|
| Dining |
| Den |
| Living |
| Bed |
| Bath |

Appliance
Stove
Refrigerator
Dishwasher
Sink

Counter Top

Cabinets
Base Cab
Wall Cab

Flooring

Wall Covering

Style: Any / County / Modern / Rustic

Design: Any / Martha / Eddy

Price: Any / Standard / Level 1 / Level 2 / Deluxe / Low / Med / High

Material: Any / Wood / Brass / Steel / Chrome / Caremark

Color: Any / White / Blue / Beige / Green / Brown

Search —312

Kitchen Item Selection

Home | Help  Send note to builder | See selections needed to be made | See selections need by date

| Style | Design | Price | Material | Color |
|-------|--------|-------|----------|-------|
| Country | Any | Standard | Any | White |

Search

Kitchen
- Appliance
  - Stove
  - Refrigerator
  - Dishwasher
  - Sink
- Counter Top
- Cabinets
  - Base Cab
  - Wall Cab
- Flooring
- Wall Covering Dining
Den
Living
Bed
Bath

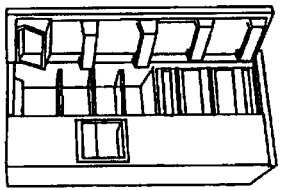

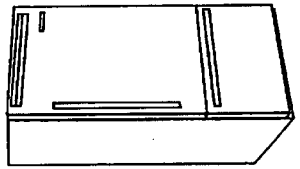

TPX24PPBWW - GE PROfile Performance™ 23.5 Cu. Ft. Custom Style™ Side-By-Side Refrigerator with Dispenser.

See More Info ← 322

Add to my Cart ← 326

The VCBB Built-in, 36" wide, Bottom-mount Refrigerator/Freezer

See More Info

Add to my Cart

320

Sub-Zero
328 — See more info

Kitchen Item Selection

Home | Help | Send note to builder | See selections needed to be made | See selections need by date

| Style | Design | Price | Material | Color |
|---|---|---|---|---|
| County | Any | Standard | Any | White |

342 → 344 → 346 → 332 → Search

| Kitchen | |
|---|---|
| Dining | Appliance |
| | Stove |
| | Refrigerator |
| | Dishwasher |
| | Sink |
| Den | |
| Living | Counter Top |
| | Cabinets |
| Bed | Base Cab |
| | Wall Cab |
| Bath | Flooring |
| | Wall Covering |

TPX24PPBWW - GE Profile Performance™ 23.5 Cu. Ft. CustomStyle™ Side-By-Side Refrigerator with Dispenser

- Trimless Model
- 23.5 cu ft (Fresh Food 14.48 cu ft / Freezer 9.05 cu ft)
- Exclusive Water by Culligan™ Provides Cleaner, Better Tasting Water and Ice through the LightTouch! Dispenser (Chilled Water, Cubed and Crushed Ice)
- Smart Storage System (1 Adjustable Humidity Crisper, 1 Convertible Meat Keeper with Cold Control and 1 Adjustable Humidity Snack Pan)
- 3 Adjustable Glass Fresh Food Cabinet Shelves (2 Slide Out, Spill Proof)
- Quick Space™ Shelf
- Adjustable Modular Gallon Door Bins Add to my Cart
326 → 330

FIG. 28

FIG. 29

Link to manufacture sites

Home Page | See current selections | Help

- Concrete
- Materials Marketing
- Natural Stone
- Wood-Plastic
- Arcat
- Corian
- Dryvit Systems
- Formica Corporation
- Fypon Molded Millwork
- Stevens Roofing Systems
- Wilsonart
- Doors-Windows
- Hurd
- Kolbe & Kolbe
- Loewen
- Marvin
- Pella
- Simpson Door
- Equipment
- Grohe America
- Kohler
- Moen
- Sub-Zero Freezer
- Electrical
- H. A. Framburg
- Lamphouse
- Lutron Electronics
- Leviton
- Residential Cabling HOME
UPCOMING EVENTS
PRODUCTS
CONTACT US
SUB-ZERO GALLERY
TRADE
QUINTESSENTIAL SUB-ZERO

TASTE SOMETHING NEW (CLICK HERE)

SUB-ZERO®

PRODUCTS

TRADE

340

FIG. 30

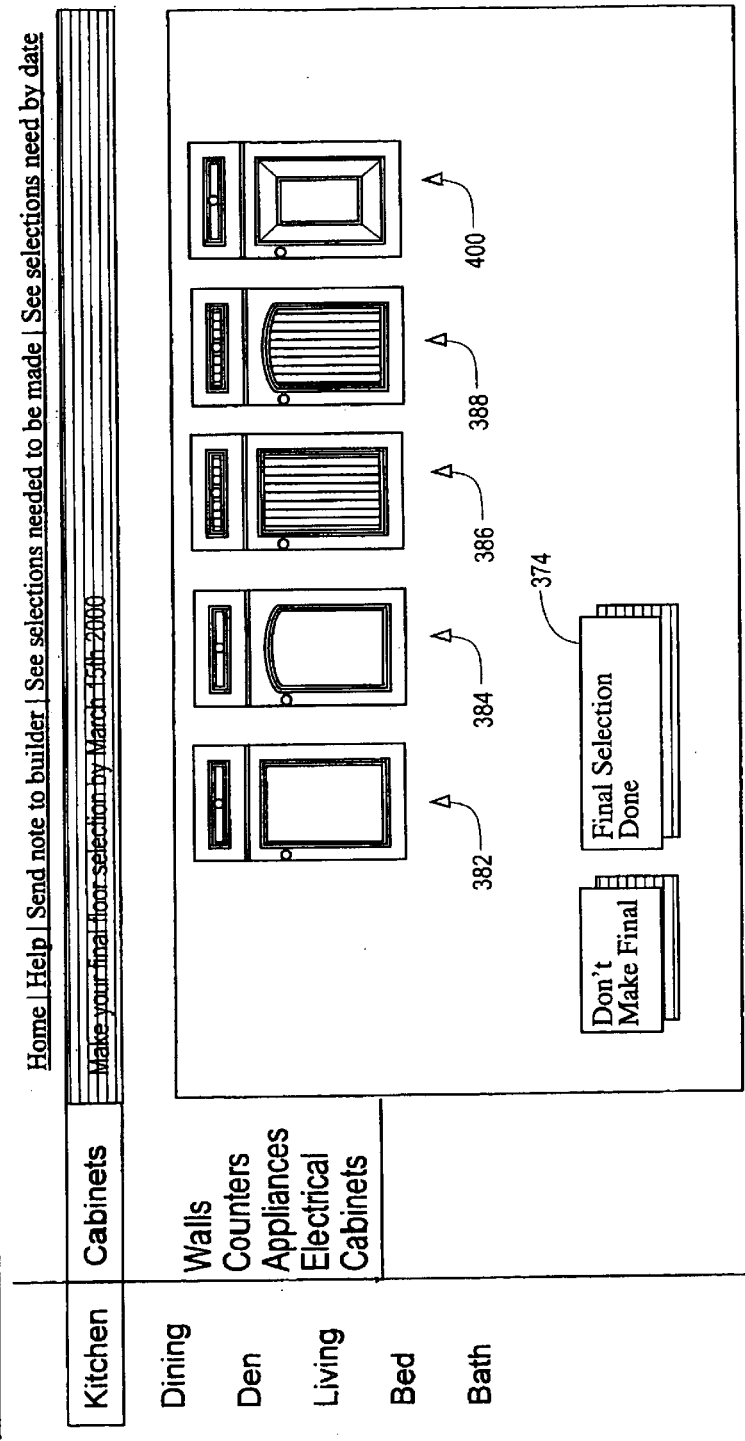
FIG. 33

BUILDERS ON-LINE ASSISTANT

FIELD OF THE INVENTION

The invention relates to the construction industry and more particularly to methods of coordinating, displaying, processing and expediting selection processes of building options.

BACKGROUND OF THE INVENTION

Construction is a very detail-oriented industry. Often a buyer (customer) and builder or general contractor (GC) will meet many times to explore, select and negotiate overall scope and terms of a construction project. Often the only basis that a builder (GC) may have for quoting a price is a vague set of architectural drawings (layouts) and a general "sense" of what the customer desires. In such cases, the builder may estimate the cost of "fitting out" a building based upon past experience or upon local trade craft for "typical" or "standards".

In the case of residential construction, a myriad of standard or above standard choices faces the customer once a contract has been signed. Often a builder will provide a number of options with regard to overall house design and functionality. Some options may relate to room and/or kitchen layout. A number of mechanical system options, such as heating and cooling, may also be provided. Basement (either finished or unfinished) or crawl space or extra large garages may be available. Each option (or package of options) usually has its own advantages and disadvantages that may appeal to one customer over another.

Once the overall layout and functionality of a house is complete, the selection process may become even more involved. Design preferences such as floor coverings must be selected, kitchen and bathroom designs must be finalized. The customer must decide what color to paint the walls or whether wallpaper is a better choice.

The finalization of kitchen design is an especially complex process of integrating the various parts of design, products and "hook-up" of water, electric services, etc. Kitchen cabinets must be selected from any of a number of confusingly similar quantity, quality and feature options. Countertops, sinks and faucets must be coordinated to fit and function. Provision must be made for built-in appliances. Water, sewer and electric connections must be considered for each option. After cabinets have been selected, appliances may be ordered to conform to the overall design, or visa versa.

Bathroom choices are equally complex. Fixtures such as sinks, toilets, tubs and faucets must be selected. If the bathroom is to be tiled, then a type and color(s) must be selected to conform to the other choices.

Usually a builder provides an allowance for each option. The cheapest (or most popular) option may be included in the overall construction price. Where another option is selected, the customer may incur an additional charge or receive credit against the construction price, which must be included in calculations regarding credit, product installations and profit.

While builders are usually able to track the customer selection process, the process requires countless hours on the part of the builder and customer in presenting options and recording choices made by the customer. Further, no true "retail" outlet exists for these, essentially sub-trade industry products (i.e., faucets are available at plumbing supply showrooms, doors and trim at lumber yards, appliances at appliance stores. Likewise, there are varied industry and non-trade pricing that apply to these industry products.

Where the customer and builder have busy schedules, choices are often not made in a timely manner. Further, the Statute of Frauds requires a written note or memorandum (e.g., a signed contract, change order, etc.). Accordingly, a need exists for a means of facilitating the presentation and documentation process of products, services and processes of the construction industry.

SUMMARY

A method and apparatus are provided for servicing a customer of a contractor by a third-party website provider. The method includes the steps of providing a website by the third-party website provider for use by the customer in selecting product options for product offerings provided by the contractor or vendor, receiving from the customer through the website a selection of an option of the options provided by the contractor or third-party manufacturers and collecting a fee or commission based upon the received selection made by the customer and/or an advertising revenue for the "pass through" of options at such point of purchase.

BRIEF DESCRIPTION OF THE DRAWINGS

FIG. 6 depicts a purchase offer that may be made to a builder using the system of FIG. 1;

FIG. 7 depicts a sign-on screen that may be used by a customer or builder of FIG. 1;

FIG. 8 depicts a screen that may be viewed by a builder using the system of FIG. 1;

FIG. 9 depicts a list of purchase offers that may be viewed by a builder using the system of FIG. 1;

FIG. 10 depicts a particular purchase offer that may be viewed by the builder using the system of FIG. 1;

FIG. 11 depicts a virtual showroom that may be visited by a customer of a builder using the system of FIG. 1;

FIG. 13 depicts a more detailed options selection screen that may used by a customer of a builder using the system of FIG. 1;

FIG. 18 depicts a new user setup screen of the system of FIG. 1;

FIG. 21 depicts an options selection screen of the system of FIG. 1; and

FIG. 26 depicts possible search criteria that may be made through the webpage of FIG. 25;

FIG. 27 depicts search results that may be downloaded through the webpage of FIG. 26;

FIG. 28 depicts additional detail of a specific product that may be downloaded through the webpage of FIG. 27;

FIG. 29 depicts additional information that may be downloaded through the webpage of FIG. 28;

FIG. 30 depicts a status ledger that may be provided by the system of FIG. 1;

FIG. 33 depicts cabinet detail that may be downloaded through the webpage of FIG. 25;

Figure 1:
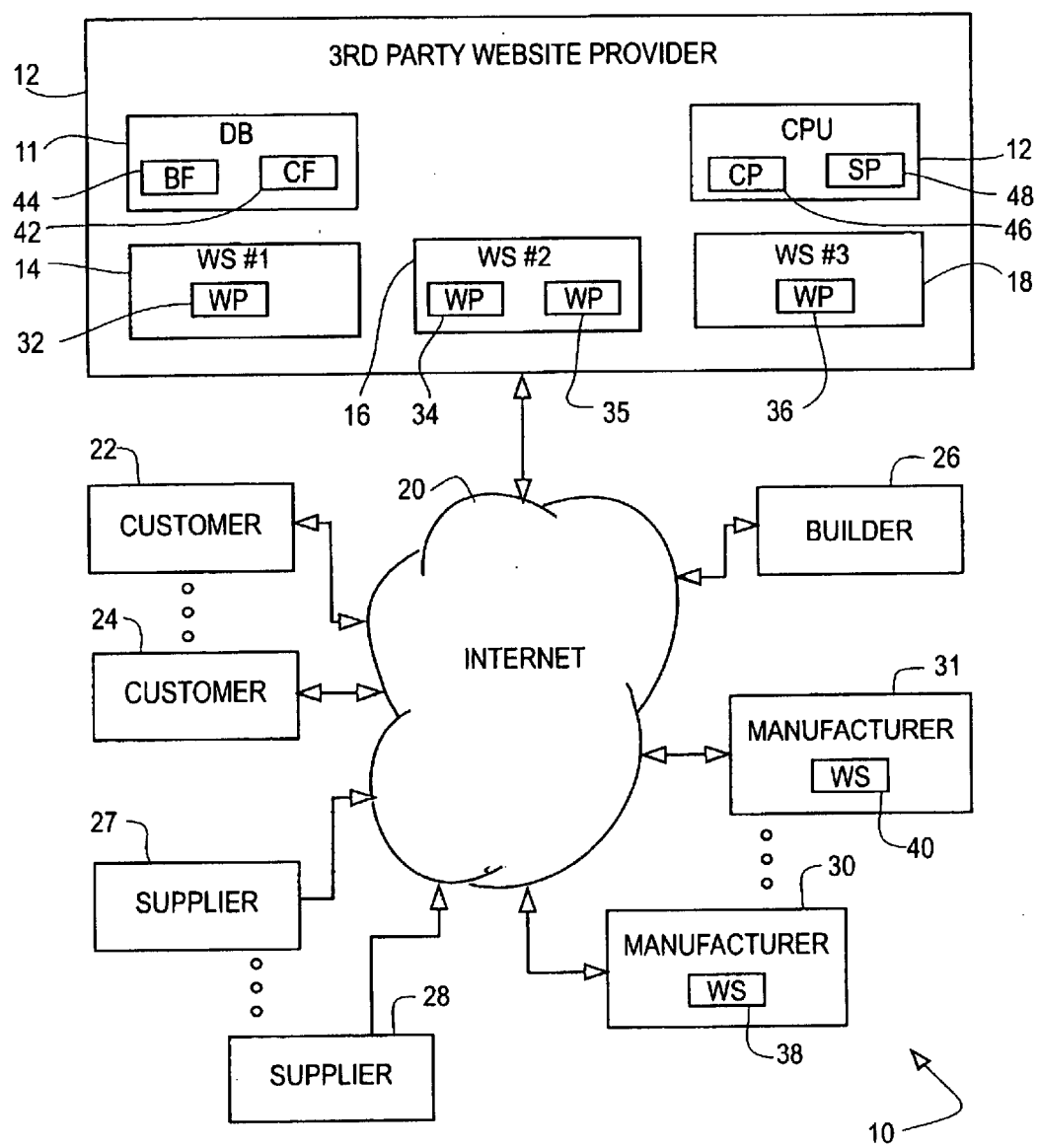
FIG. 1 is a block diagram of an system for servicing a customer of a builder in accordance with an illustrated embodiment of the invention.

Appendix I is a series of screens that a visitor to the system 10 may view in succession.

DETAILED DESCRIPTION OF A PREFERRED EMBODIMENT

The market for the system provided herein is, for example, the over 65,000 builder-members of the Home Bu ilders Association, over 100,000 U.S. builders, the over 1,600,000 new-home starts per year or the millions of re-sale homes which need home improvements. An average home of about $200,000 provides a general market volume of over $300,000,000,000. The "secondary" product market of new-home starts is referred to as "standards and extras". Typically, some selections are referred to as standards and offered at no additional cost such as predefined grades of carpet, counter tops, cabinet, and some basic fixture colors. Standards are generally base grade and thus extras become a significant cost to buyers and a profit center to builders. These secondary extras often run from 1% to 20% or more of the original house price. This sub-market (at even 10% of the overall market) amounts to $30,000,000,000.

It is not unreasonable to state that one of the most frustrating parts of the buyer/builder relationship is: 1) the standards and extras selection process and 2) the contract and administration process. Standards are standard options provided at no additional cost by the builder. Extras are at extra cost. The standards and extras selection process has no industry standards. Furthermore, buyers, (who feel stressed by the purchase anyway) often feel as though they are a "captive market" to their builder's pricing and selections, since they have no other "market" for shopping or comparing.

Likewise, builders (already at the mercy of their sub-trades and their vendors and having enough difficulty coordinating the overall process of home construction on a fixed schedule) have trouble translating their buyer's "dream home" into product, pricing and coordination. This is particularly difficult due to the broadly varied products to select and coordinate deliver from since no "hub" exists from which both builder and buyer can both select products. In fact, many products have no retail availability except from manufacture to trade-person.

Buyer's are often restricted to builders' job-site show rooms and sales centers (if any) and builders' sales people. The show rooms and sales centers often have limited product information, limited hours, and offer little assistance in "shopping" outside their builders' showroom. Often buyers want to see standard options and extras before signing the home buying contract, which builders view as difficult and a waste of time until the larger contract is executed. This leads them to the builders' selections center that is often ill-kept and not well "merchandised". Most builders build the selections center as a small part of a temporary sales office located on-site or simply maintain a library of industry catalogs and brochures.

The contract process can be just as hard on both buyer and seller (i.e., the builder/GC). There is no standard contract (unlike the typical local realtor contracts for existing homes). Buyer and seller often rely on lawyers to negotiate both broad and fine points from scratch. Once executed, the complex language in the contracts is normally intimidating rather than serving as a help in instructing the buyer on how to proceed toward options selections and closing. Often the contracts are burdened by references to such disasters (e.g., fire, flood, strikes, etc.) as to discourage the buyer from executing the contract.

Builder's brochures (or web sites) offer such sales messages to buyers as to: 1) the home facade and layout; 2) the location and 3) the builder. However, they do not do much to address the standards/extras or the contract. These are left as subsequent hurdles. Builders spend thousands on sales centers whose primary focus is, again, the home design, layout, facade, lot, room dimensions, the location and the builder. The only other place buyers can look at products is a local retailer (e.g., Sears, Best Buy, Home Depot, etc.). However, the local retailer is not focused on sales to the sub-contractor and not to the buyer-builder relationship.

FIG. 1 is a block diagram of a system 12 which substantially addresses these problems. The system 12 may be operated by a third party website provider on one or more central processing units (CPUs) 12 and databases (DBs) 11. Under the illustrated embodiment, one or more interactive websites 14, 16, 18 are provided by the CPU 12 for the benefit of customers 22, 24, contractors (e.g., builders) 26, suppliers 28 and manufacturers 30. The websites 14, 16, 18 are interactive (in addition to the normal sense of being interactive to website users) in that information entered through one website may be made available to and be used by a user of another website (as described below). Further, it should be understood that while customers 22, 24 may be considered customers in the normal sense of the word, a contractor 26 or supplier 27, 28 may also be a customer in another sense, as described hereunder. As used herein, a contractor is defined as any person who sells a tangible product and who also physically installs that product.

The system 12 of FIG. 1 is shown with a single contractor 26, a number of customers 22, 24, a number of suppliers 27, 28 and a number of manufacturers 30, 31. The illustrated embodiment, in fact, will be described primarily in the context of the interaction between the single contractor 26 and his customers 22, 24 and suppliers 27, 28 and between the customers 22, 24 and manufacturers 30, 31. It should be understood, however, that the system 12 may have many such contractors 26, each with its own customers 22, 24 and suppliers 27, 28. Further, the customers 22, 24 and suppliers 27, 28 may simultaneously deal with many different contractors 26 through the system 12. Manufacturers 30, 31 may deal with many different customers 22, 24 of many different contractors 26.

Figure 16:
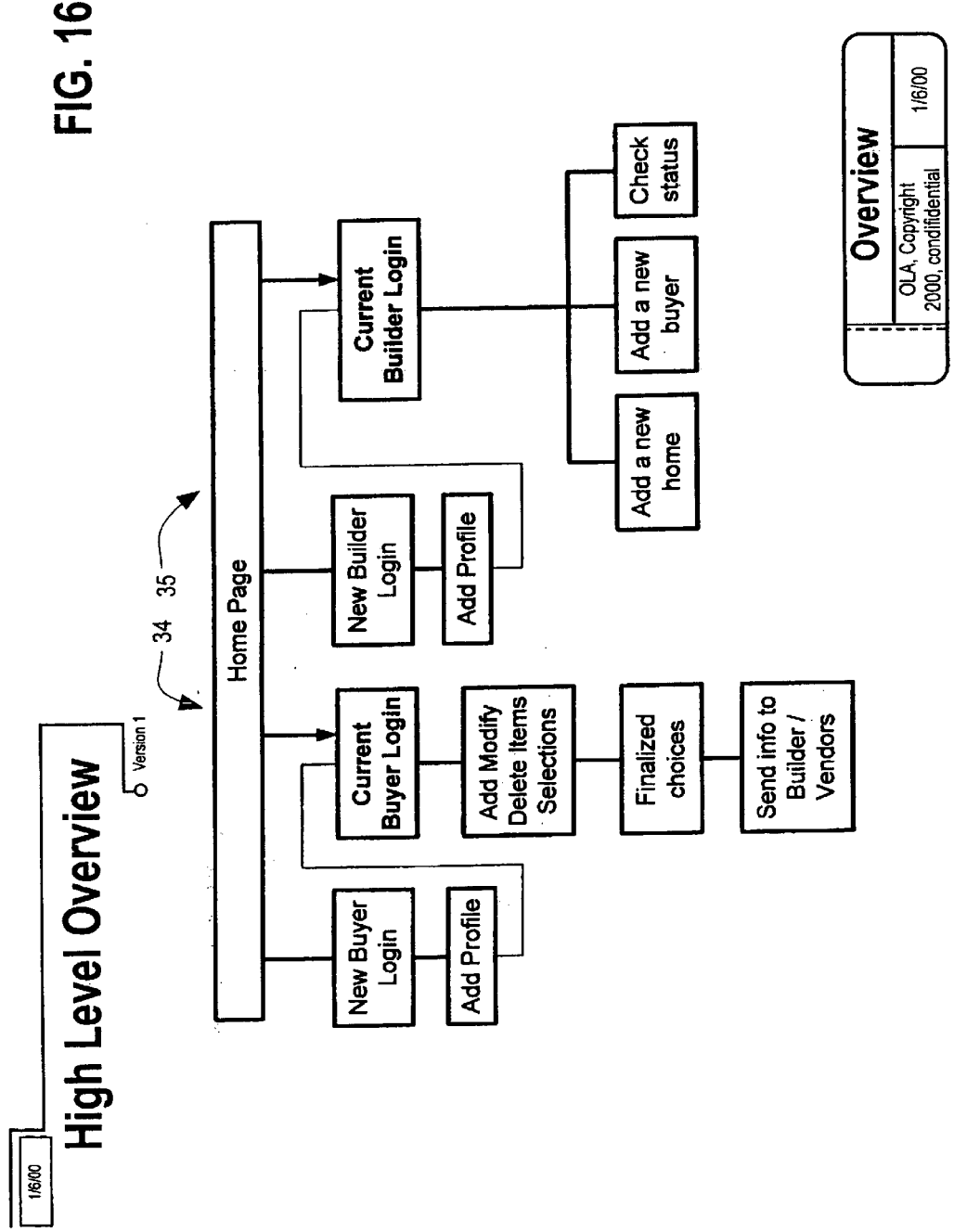
FIG. 16 provides a high level overview of website use of the system of FIG. 1.
Figure 17:
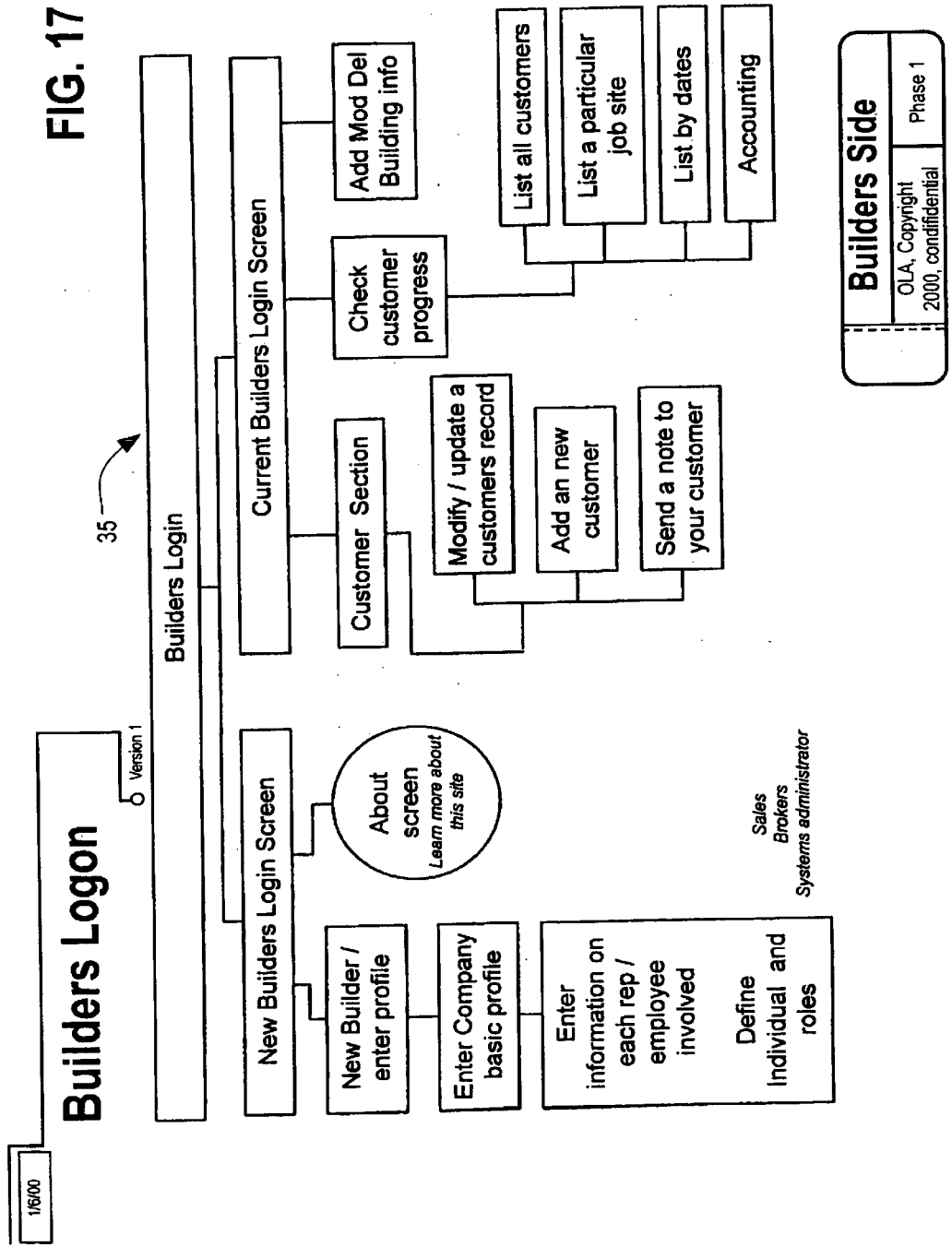
FIG. 17 depicts builder logon and use of the builders website of FIG. 1.

A contractor 26 may maintain one or more webpages 34 on a first website 16 for the benefit of customers 22, 24. The various screens of the webpages 34 may include product offerings relating to many different product spaces as well as standards and options available to buyers (e.g., customers 22, 24). The webpages 34 may also include product offering contracts that may be downloaded by customers 22, 24. FIG. 16 provides a high level overview of activities that may be accomplished by a customer 22, 24 and contractor through the website 16.

As used herein, a product space is the physical space within which the product is to be installed. A product offering includes the product as well as the installation of the product in its product space. In the context of new home construction, the product space may be a bathroom, a bedroom or the lot where a house (the product) is to be built.

Further, a product offering on the first website 16 may be a mix and match of various levels of product offerings. For example, a first contractor 26 ("A") may have a product offering that may be an integration of the various product offerings which are together commonly referred to as a home.

A second contractor 26 ("B") may specialize in a particular type of bathroom. The second contractor B (on a first level) may be a subcontractor of the first contractor A. A bathroom by B may be included by A in A's overall product offering. As such, a bathroom by B is one of A's product offerings. However, both A and B may both maintain webpages 34 on the builders website 16. In fact, A and B may have webpages customized by each builder 26 for the precise needs of the product offering of the builder 26.

The maintenance of separate webpages 34 by both A and B benefit both A and B. For example, if A includes B as a product offering, then A may simply list B as a product offering and allow a customer 22, 24 to visit B's website to obtain information about the offering. Further, the customer 22, 24 may also want to visit builder C and D to view other product offerings for bathrooms.

The second website 14 may be accessed primarily by customers 22, 24. Customers 22, 24 may open password protected, personal webpages 32 based upon a request transmitted to the CPU 12. The webpage 32 may be used to display information contained within a customer file 42 stored in the database 11. The file 42 may be used by a customer 22, 24 as a personal repository of information from the contractor's website 16 either as a potential or as an actual customer of the contractor 26.

The third website 18 may be marketed to the general public and may be accessed by any customer 22, 24 or member of the general public. The third website 18 may be designed similar to a retail store for on-line purchases and project coordination of builder-rehabber products. The third website 18 is intended to feature projects and pricing directed to capital improvements. As such, the third website 18 provides a retail-catalog showroom for manufacturers products in a way that will be discussed below in more detail.

Product offerings may be created in any of a number of ways. A contractor and customer may sit down and negotiate the terms of a product offering agreement. The product offering agreement may specify an overall product offering (e.g., a house) with many included product offerings (e.g., a kitchen, two bathrooms, etc.).

At least some of the included product offerings (hereinafter referred to simply as "product offerings") may include choices that must be made by the customer 22, 24. In the case where the product offering is a bathroom, the standard options may be a choice between two types of sinks from a particular manufacturer. Alternatively, the term "standard options" may refer to an allowance (i.e., in dollars) which the contractor will allow the customer 22, 24 to spend for purchase of the product associated with the product offering.

Under the illustrated embodiment, each product offering is associated with a category space. In some cases a category space may include several product offerings. For example, in the context of a home, a category space may be a bathroom. One product offering associated with the bathroom may be a sink, another may be faucets on the sink, a third may be a toilet or a tub. Other product offerings may be the color or type of paint that may be applied to the walls or whether tile is installed on the floor.

Under an illustrated embodiment of the invention, each category space is associated with one or more pages of a virtual showroom. Within the showroom, the standard options and extras options may be displayed, either as text or under a pictorial format.

The database 11 is provided with specific information with regard to the products contained within each product offering. The CPU 12 and DB 11 interact to form a relational database that is able to select categories based upon a category space. A menu associated with the virtual showroom allows the CPU 12 to select and organize category cells matching product with category spaces and "drill down" to the essential information for decision making.

Alternatively, the CPU 12 may organize the category cells based upon brand identity (i.e., the name of the manufacture) or based upon stylistic groups (i.e., a Martha Stewart collection). Organization of cells may be altered by the customer 22, 24 based upon entry or selection of key words within an interactive window associated with particular segments of the virtual showroom.

Where product has been identified in advance by the contractor 26, a category cell may include the identified product as a standard option. The category cell may contain other standard options as well as extras options. Where no product has been identified (i.e., the contractor has given the customer an allowance for purchase of a product), the category cell may include hyperlinks to a website 38 of a manufacturer 30 who offers products which fall within the category cell.

To simplify selection of product offerings, a contractor 26 may maintain a list of standard product offerings on his website 16. The information of the standard product offerings may be accessed by customers 22, 24 to purchase a product offering or to simply comparison shop among contractors 26.

Following is a detailed example of a product offering set the context of a home purchase. While the detailed example is set into the context of home buying, it should be understood that a product offerings may be set in any context involving the transfer of goods in conjunction with services.

FIGS. 16–22 are flow charts that are specifically related to the methods described above and set in the context of home building. Reference shall be made to FIGS. 16–22 as appropriate to an understanding of the invention.

The customer 22, 24 may access the information of webpage 34 of the builder 26 using either of two possible routes. As a first route, the customer 22, 24 may enter the builder's website 16 through the front door (directly from the customer 22, 24 to the website 16 through the Internet 20) and view product information and options. The steps of logging-in under this process may be better understood by reference to the left side of FIG. 16. The disadvantage of this approach is that the customer 22, 24 does not have local storage at the website 16.

Figure 19:
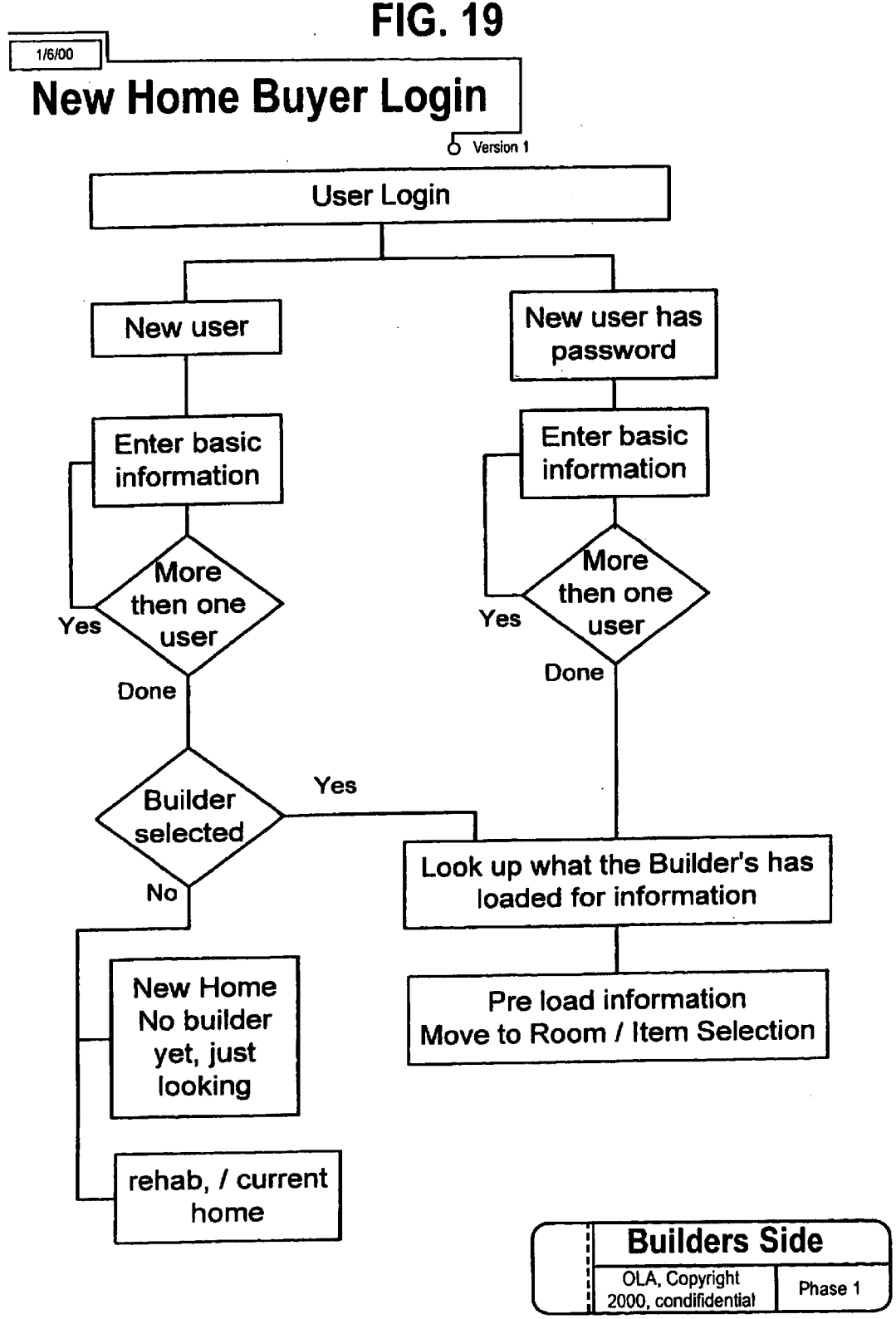
FIG. 19 depicts a new user logon to the system of FIG. 1.
Figure 20:
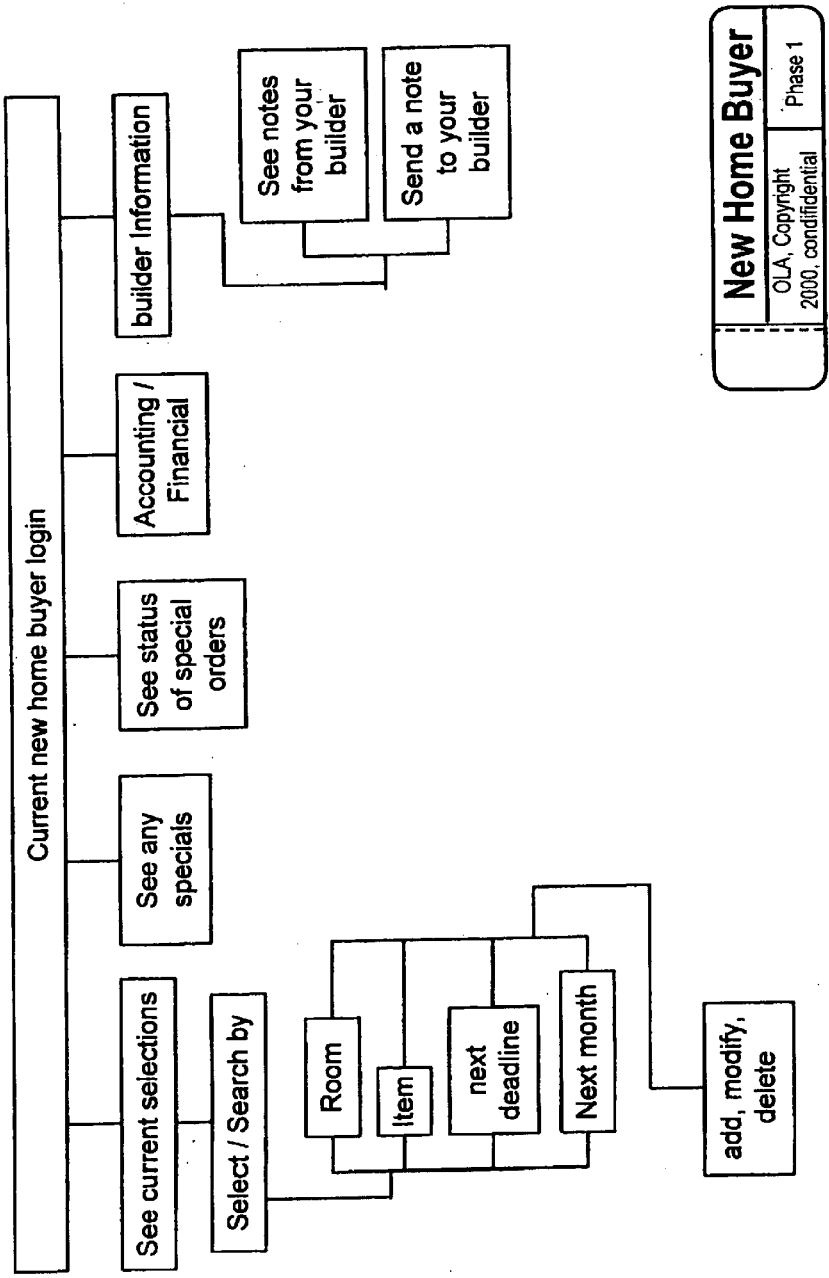
FIG. 20 depicts logon to the system of FIG. 1 by an existing user.
Figure 22:
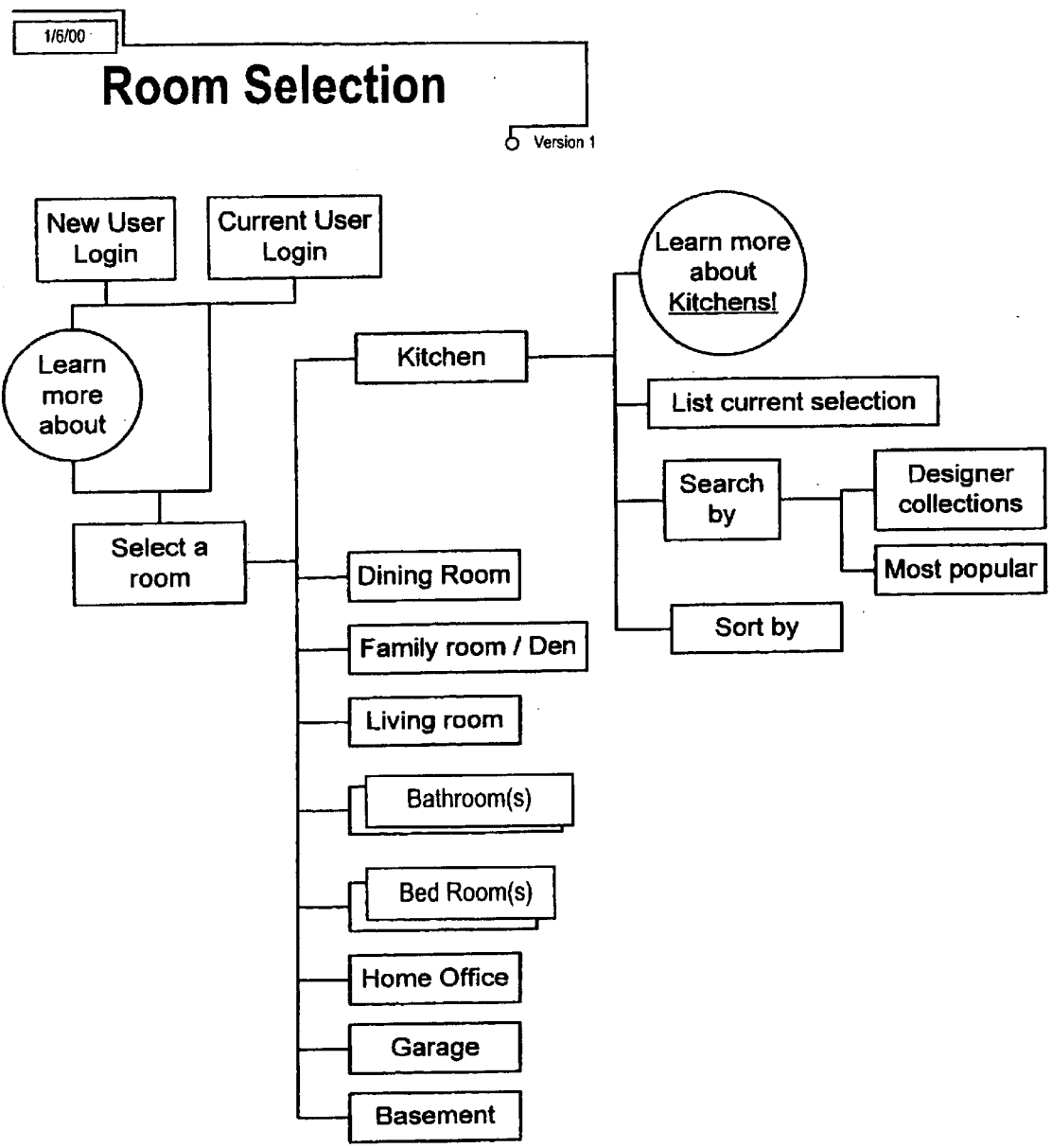
FIG. 22 depicts an options selection screen used by the customer of FIG. 1.

Alternatively, the customer 22, 24 may access the webpage 34 of the builder through another door (i.e., the back door). Accessing the builder's webpage 34 through the back door is accomplished through the customers website 14. Reference may be made to FIGS. 19 and 20 for a better understanding of the log-in procedure.

If the customer is a new user, then the user may be asked for a name or other identifying indicia. The user may also be asked to select and use a password. Further, as shown in FIG. 19, more than one user may share a customer file 42. The ability for more than one user to share a file 42 may be of use when a buyer wishes to share information associated with a home purchase with another party (e.g., a mother-in-law).

The customer 22, 24 may locate the webpage 34 of the builder 26 through a local directory of builders offered through the website 14. Upon locating the webpage 34 of the builder 26, the customer 22, 24 may review and store information from the builder within the customer's file 42.

If a customer 22, 24 has not already requested a personal webpage 32, a webpage 32 may be opened once the customer has reached agreement with the builder 26 as shown in FIG. 18. Once a customer 22, 24 has signed a building contract, the builder 26 may help the customer 22, 24 open a customer file 42 in the DB 11 and provide a personalized webpage 32 for the customer 22, 24 on the customers website 14 customized to the house selected by the customer 22, 24. The customer 22, 24 and builder 26 may share passwords for access to the customer file 42.

If the customer 22, 24 had already opened his own webpage 32, then the customer 22, 24 may already have downloaded information (FIG. 20) regarding the selected house to his file 42. In either case, the customer 22, 24 is not required to share use of the file 42 with the builder 26.

Using the webpage 32, the customer 22, 24 may view and select standard options and extras for his particular house, which may be received by a selection processor 48 and stored in the customer file 42. As the customer 22, 24 selects standard options and extras through his webpage 32, the builder 26 may review those selections through his website 16, if he has been given access to the customer file 42. Alternatively, the customer 22, 24 may e-mail a file containing one or more of the selections to the builder 26.

Under the illustrated embodiment, an owner of the third-party website provider 12 may receive a commission for processing the selections of each customer 22, 24. The commission may be a flat fee or may be a percentage of purchases collected by a commission processor 46. The details, scope and situations given rise to a commission will be discussed in greater detail below.

Figure 2:
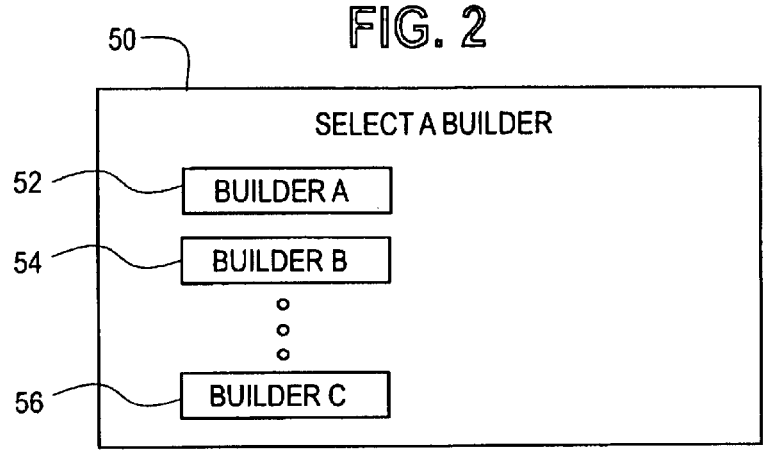
FIG. 2 is a screen of a webpage that may be viewed through the system of FIG. 1.

FIG. 2 depicts a builders directory webpage 50 that may appear on the customer's terminal 22, 24. The builders directory 50 may be viewed either through the builders website 16 or though the customers website 14. As shown, a customer 22, 24 may be offered the opportunity of viewing webpages 34 of any of a number of builders. A customer 22, 24 may view a webpage of a particular builder by activating a softkey 52, 54, 56 associated with a selected builder.

Figure 3:
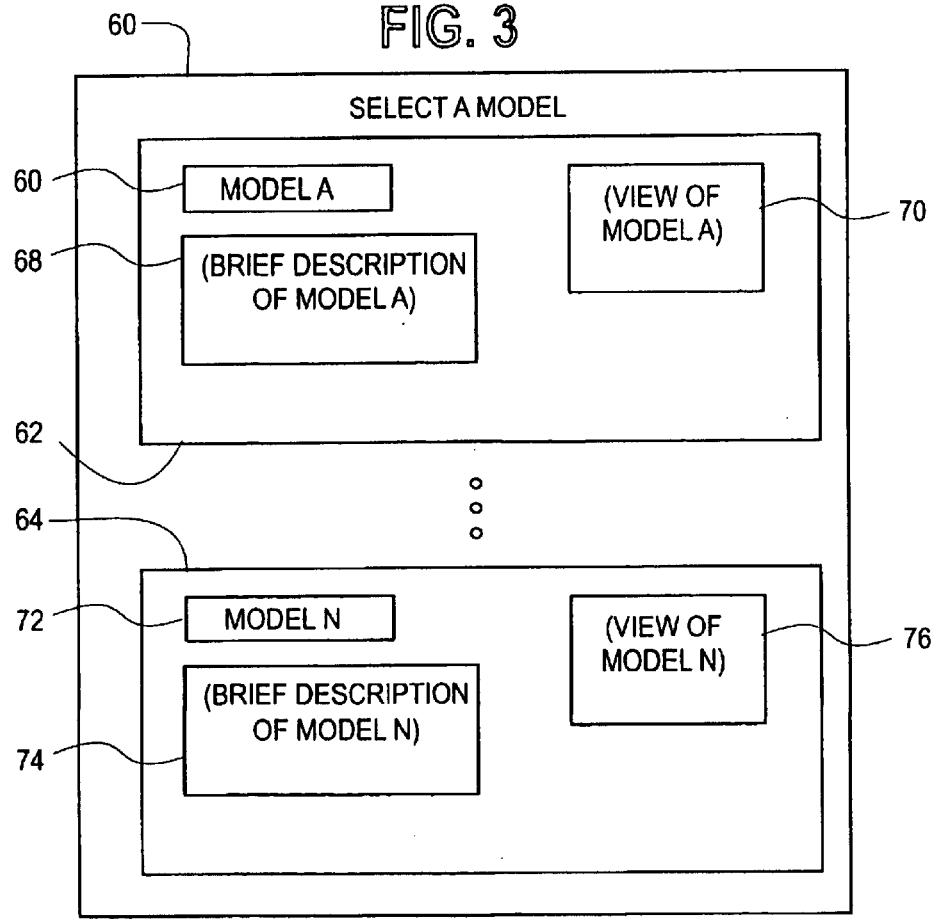
FIG. 3 is a screen of a webpage of a builder that may be viewed through the system of FIG. 1.

FIG. 3 depicts a webpage 60 that may be presented to the customer 22, 24 based upon activation of a particular softkey (e.g., 52) of FIG. 2. (Webpage 60 is depicted as webpage 34 of FIG. 1 where the customer 22, 24 accesses the website directly through the builders website 16 or as webpage 32 where the customer 22, 24 accesses the builders information through the customers website 14.) As shown on the builders webpage 60, the customer 22, 24 may be presented with a number of product offerings (e.g., house models) 62, 64 offered by that particular builder. As shown, each model may have a description of each model 68, 74 as well as a picture of the model 70, 76. Each model may also have a softkey 66, 72 to obtain more information about the model.

Figure 4:
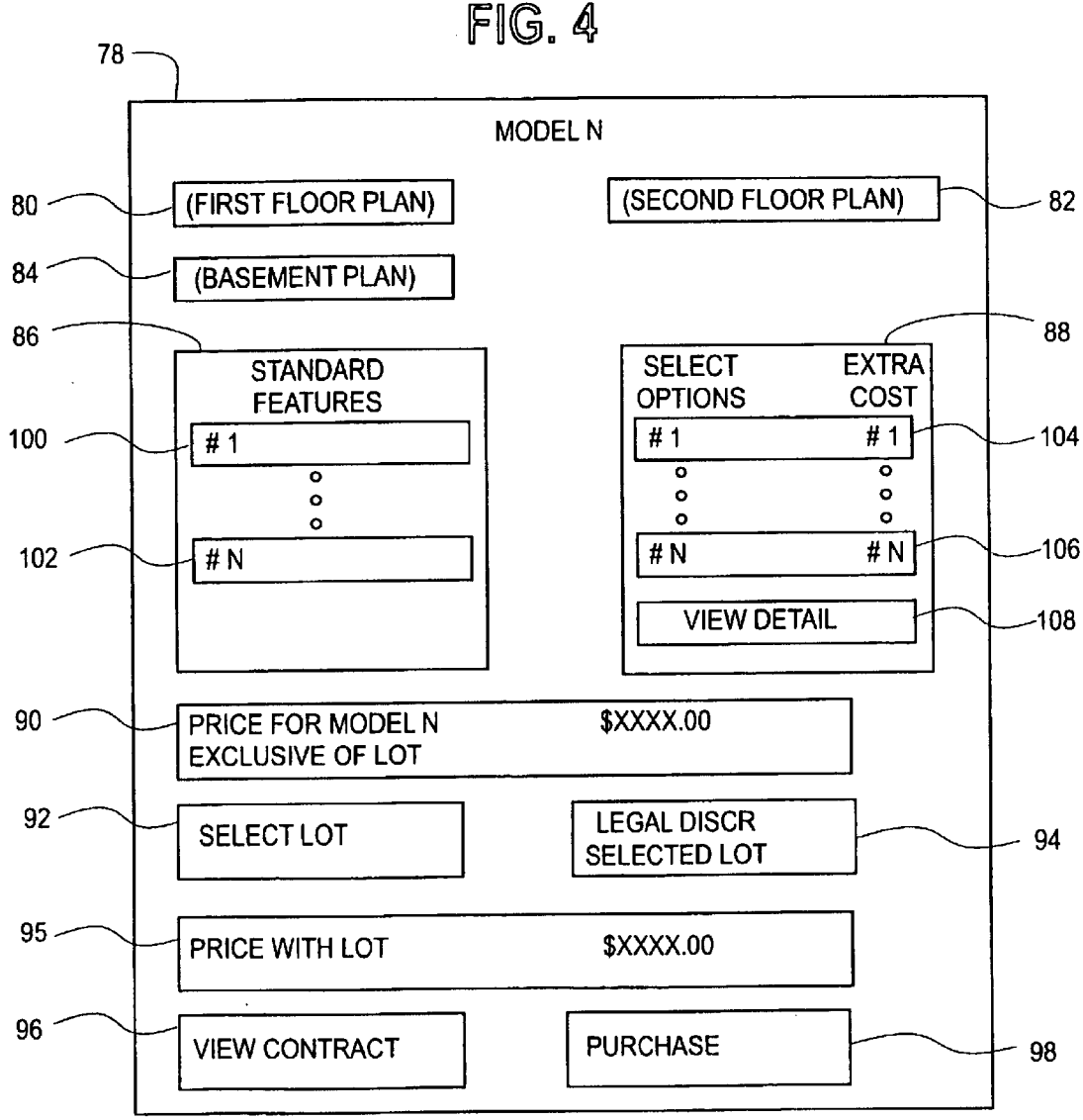
FIG. 4 is a screen showing a model of a home that may be offered by the builder using the system of FIG. 1.

Upon activation of a softkey (e.g., 66) of FIG. 3, the webpage 78 of FIG. 4 may appear on the customers terminal 22, 24 showing details of the selected product offering. As shown, floor plans 80, 82, 84 may be provided of the selected model as well as a list of standard features (standards) 86. Details of the standards 86 may be viewed by activation of a particular feature key 100, 102.

Also shown in FIG. 4 is a list of optional features 88. Shown associated with each feature 104, 106 is a price adder for each feature. Details of the feature 104, 106 may be obtained by first activating a view detail key 108 and then activating a softkey 104, 106 associated with the feature 104, 106. Activating (.e.g., double-clicking on) the feature key 104, 106 results in selection of the option 104, 106 for purchase.

Selection of options 88 causes a price window 90 to change based upon the number of options selected. The price shown in price window 90 may be exclusive of the cost of the lot. To select a lot, the customer 22, 24 may activate a select lot key 92.

Figure 5:
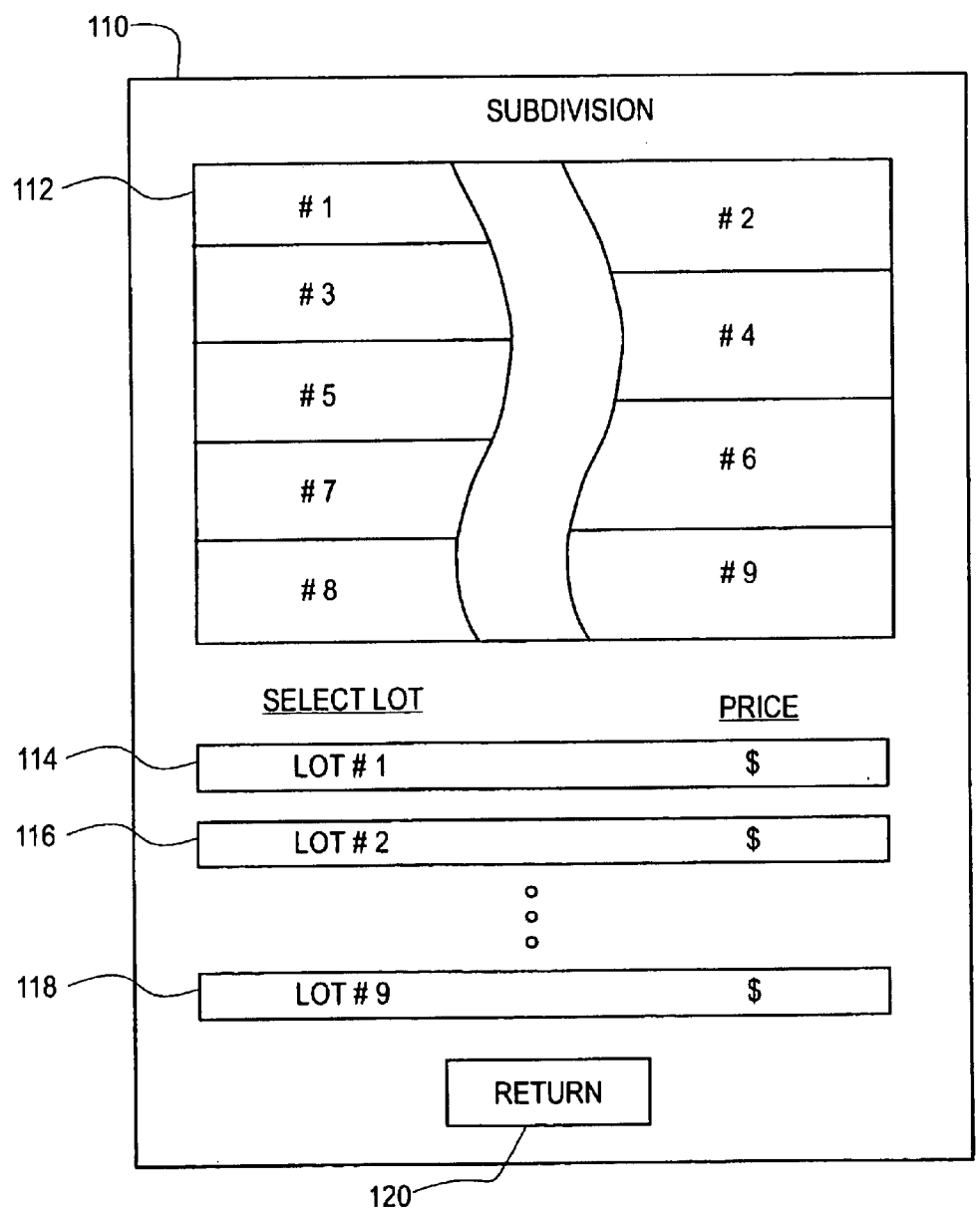
FIG. 5 depicts a subdivision that may be marketed using the system of FIG. 1.

Upon activating a select lot key 92, the webpage 110 of FIG. 5 may appear. Shown on the webpage 110 may be a subdivision map 112 showing available lots. Also shown, may be a softkey 114, 116, 118 showing a lot number and price associated with each lot.

Upon identifying a suitable lot by activating a softkey 114, 116, 118, the customer 22, 24 may activate a return key 120. Activation of the return key 120 may take the customer 22, 24 back to the previous webpage 78.

By returning to the previous webpage 78, the selected lot may now be identified in a lot window 92 along with a legal description of the lot in another window 94. The total cost of the house may now be displayed in a total price window 95.

Upon reviewing the details the customer 22, 24 may now accept the purchase by activating the purchase softkey 98. In response, the purchase offer webpage 122 of FIG. 6 may be presented to the customer 22, 24. Included within the purchase offer webpage 122 may be the home model number 124, the selected options 126, the legal description of the selected lot 128 and a total price 130.

A buyer's window 132 is presented for entry of identifying information about the customer 22, 24. Within the buyer's window 132, the customer 22, 24 enters his name in a name window 142, address in an address window 144 and telephone number in a phone window 146. The customer 22, 24 is also provided with a credit reference window 148 for entry of credit references as well as an e-mail window 150 for entry of an e-mail address.

A customer file identifier window 152 is also provided in the case where the customer 22, 24 accesses the builders webpage 34 through the customer's website 14 and has already established a customer file 42. The identifier of the customer file 42 may be automatically inserted into the identifier window 152 by the CPU 12.

Included on the purchase offer webpage 122 is a required deposit window 134 showing the deposit required to close the deal. Also included in a window 136 where the customer 22, 24 may enter a method of deposit payment.

Once the customer 22, 24 has entered his personal information, the customer 22, 24 may activate a print softkey 138 to print a copy of the product offering contract 122. The information entered into the various boxes 124, 126, 128 130, 132, 134, 146 may be incorporated into the appropriate fields of a real estate contract that the customer 22, 24 may sign and forward to the builder 26. A second, submit purchase offer softkey 140 is also provided to submit an unsigned copy of the offer to the builder. Additional output forms can be generated in support of the processing of the building order, such as a jobsite copy, purchase order, lender information, etc.

The builder 26 may access offers through a second webpage 35 of the builders website 16. Upon accessing the webpage 35, the screen 142 of FIG. 7 may be presented to the builder 26. As shown, the builder 26 may be required to enter a name and password in a name and password window 144, 146.

Upon entry of a name and password (and verification by the CPU 12, the CPU 12 may present the builder 26 with a menu webpage 150 (FIG. 8). The process of builder access to the website 16 may be better understood by reference to FIG. 17. From the menu webpage 150, the builder 26 may activate a purchase offers softkey 152 and be presented with a list of purchase offers in a purchase offers webpage 160 of FIG. 9.

Within the purchase offers webpage 160, the builder 26 may select purchase offer #1 162 for review. In response, a summary page 170 of FIG. 10 may be provided for review by the builder 26. Contained within the screen 170 may be a window 172 containing the purchase information entered by the customer through screen 122. The builder 26 may review the information and activate either an accept softkey 174 or a reject softkey 176. The builder 26 may conditionally reject the offer until the signed copy of the contract arrives or if the deposit is insufficient.

Upon acceptance of an offer, the CPU 12 first checks to see if the customer 22, 24 has a customer file 42. If the customer 22, 24 does not, the CPU 12 opens a file 42 for the customer 22, 24. In addition, the CPU 12 retrieves a features and options list from the builders file 44 and transfers the features and options list to the customers file 42. Each entry of the features and options list has a field which relates the feature and option to a product space. The features and options list represents a list of choices that a customer 22, 24 may have in the construction of the purchased home.

For example, the features and options list may include options for standard features and extras. Standard features options may include bathroom fixtures that may be chosen between at no extra cost. Extras options may be options that may available among the upgrades that may have previously selected or may now be added.

As a final step, the CPU 12 may compose an e-mail (or printed) message to the customer 22, 24 announcing acceptance of the offer. If the customer 22, 24 did not previously have a customer file 42, the e-mail message may identify the file and provide instructions for accessing the file 42 through the customers website 14. The message may also include general instructions as to the types of selections which the new home buyer may need to make and a due date for making the selections.

The e-mail may also include instructions as to how to transfer selections to the builder 26. The customer 22, 24 may be given the option of sharing a password with the builder allowing the builder 26 to access the customer's file 42. Alternately, the customer 22, 24 is given the options and instructions of how to e-mail selections to the builder 26.

Following the instructions of the e-mail, the customer 22, 24 may access the customers website 14 and be presented with the virtual showroom options webpage 180 of FIG. 11 based upon the builders features and options list transferred from the builder file 44 to the customer file 42. The process of customer access to the virtual showroom may be better understood by reference to FIG. 22. The entries of the showroom options webpage 180 may be divided by product space (e.g., kitchen 182, living room 184, bath #1 188, bath #2 190, bedroom #1 192, bedroom #2 194, bedroom #3 196) or by overall function (e.g., heating 198, air conditioning 200, house exterior options 202 fireplace 204). Further, some entries (e.g., kitchen 182, baths #1 #2 188, 190) may be accompanied with drawings to further clarify the scope of the optional features.

Figure 12:
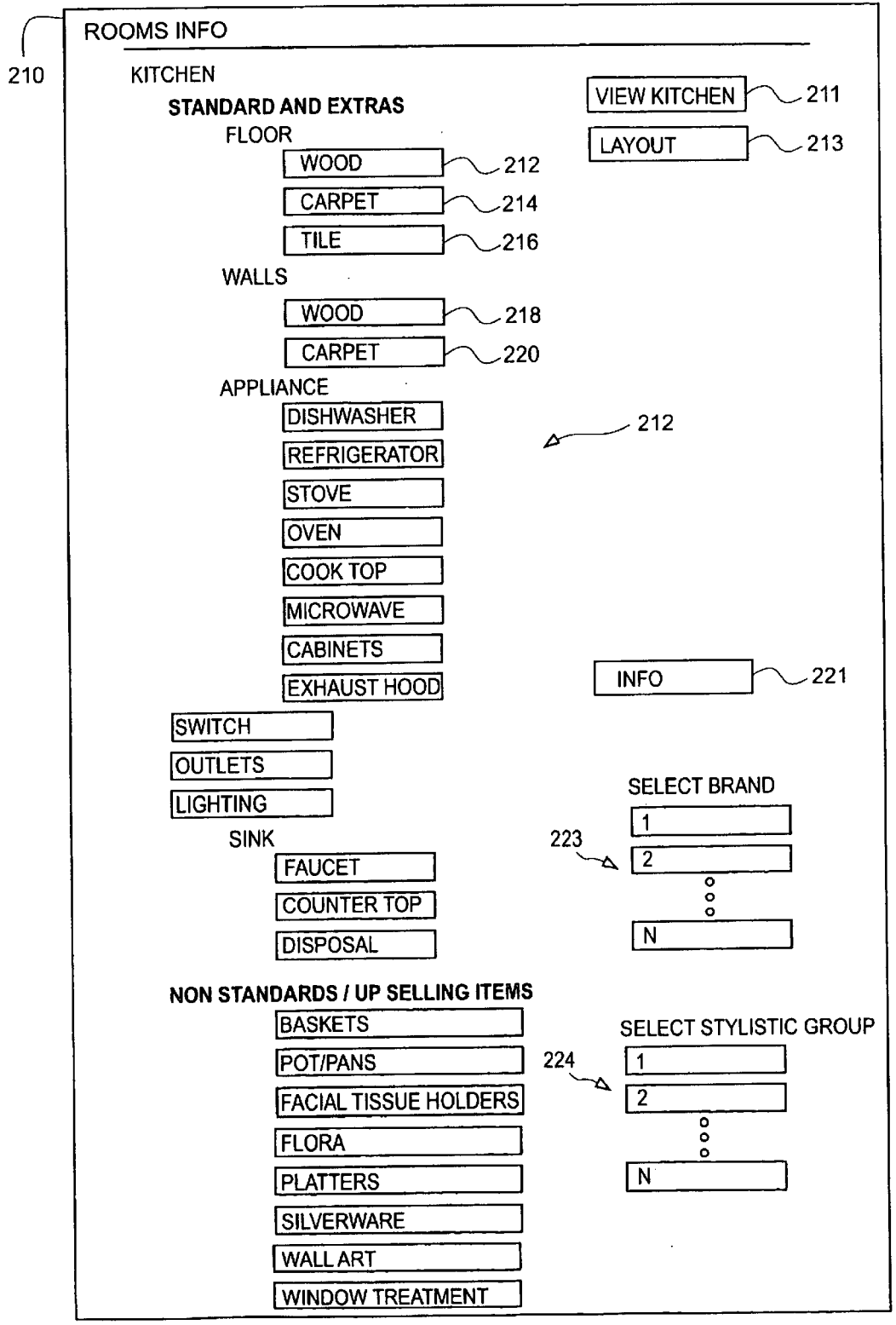
FIG. 12 depicts an options selection screen that may used by a customer of a builder using the system of FIG. 1.
Figure 14:
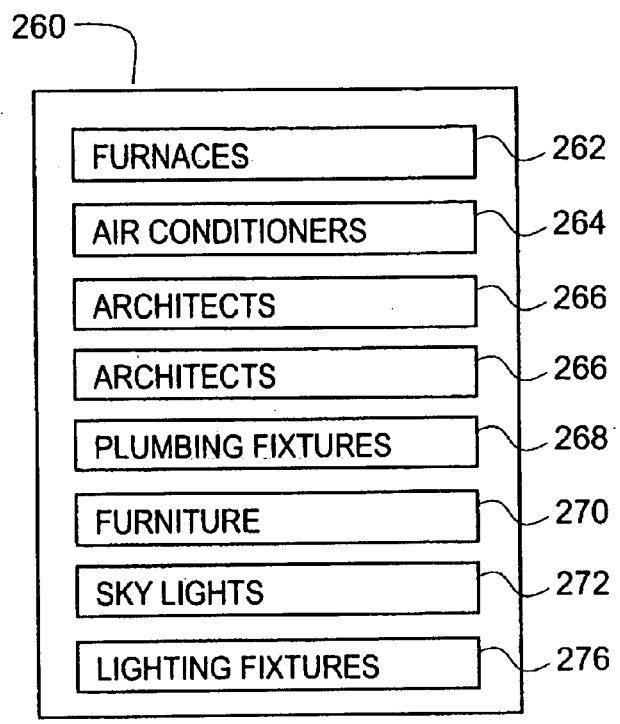
FIG. 14 depicts a showroom that may be used by customers of the system of FIG. 1.
Figure 15:
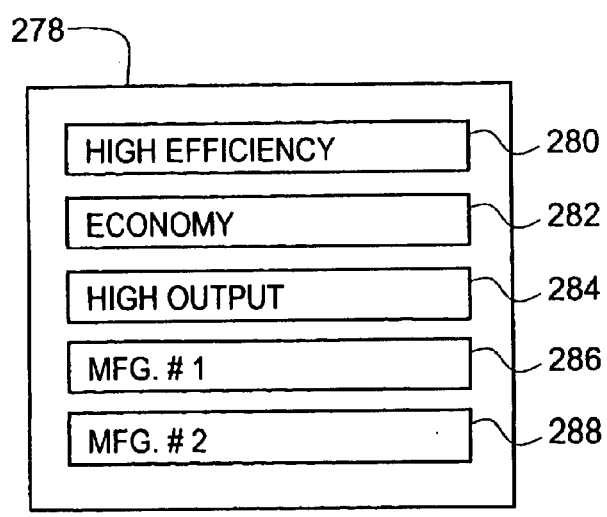
FIG. 15 depicts hyperlinks that may be used by the system of FIG. 1.

If the customer 22, 24 where to activate the kitchen softkey 182 of FIG. 11, then the screen 210 of FIG. 12 may be presented to the customer. Included within the screen 210 of FIG. 12 are a set of choices that the customer 22, 24 may have regarding construction of the kitchen.

Figure 23:
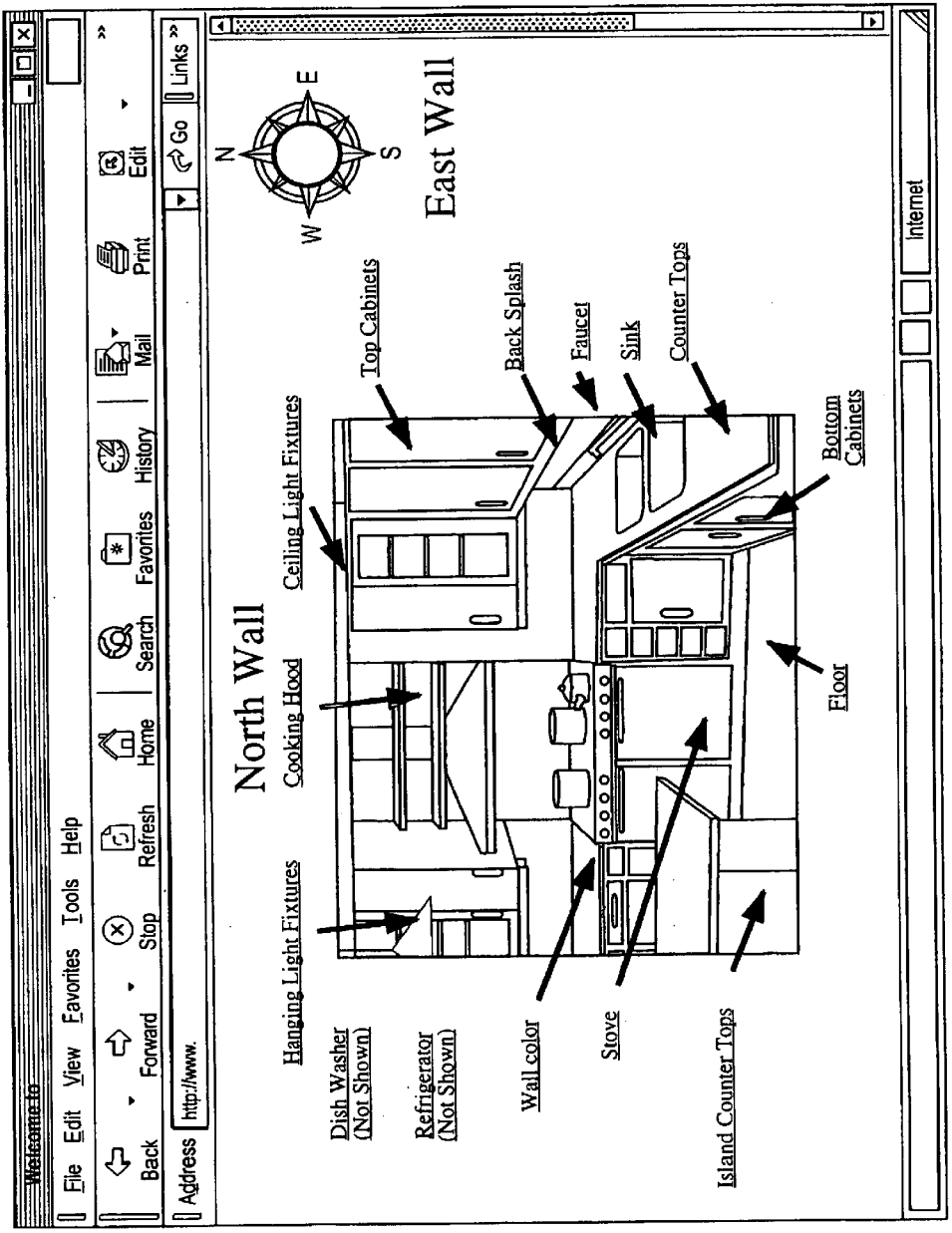
FIG. 23 depicts a web page with a prespective view of a kitchen that may be provided by the system of FIG. 1.

As a first step, the customer 22, 24 may activate a "view kitchen" softkey 211. In response, a graphical image (FIG. 23) may be presented to the customer 22, 24 providing the customer 22, 24 with the opportunity of viewing a kitchen using standard options or a kitchen with certain extras.

Figure 24:
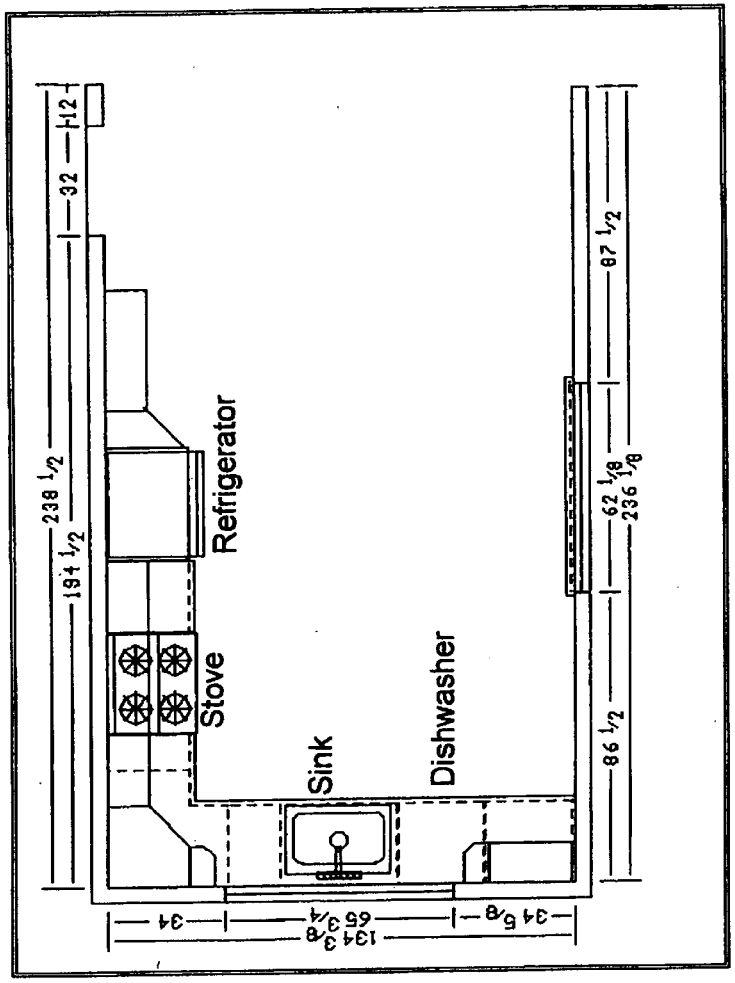
FIG. 24 depicts a plan view a kitchen that may be provided by the system of FIG. 1.

Alternatively, the customer 22, 24 may wish to view a kitchen layout. To view of layout, the customer 22, 24 may activate a layout softkey 213. Upon activation of the layout softkey 213, the customer 22, 24 may be presented with an overhead view (FIG. 24) of the kitchen.

After viewing the kitchen, the customer 22, 24 may proceed with the selection of standards and extras. For example, the customer 22, 24 may determine that carpeting may be the best choice of a floor covering for his kitchen. Accordingly, the customer 22, 24 may press the carpet softkey 214.

In response, the customer 22, 24 may be taken to the carpet selection screen 226 (FIG. 13). The carpet selection screen 226 provides at least two carpet selections 228, 234 at standard options for the customer 22, 24. As such, the customer 22, 24 could select either of the two standard options 228, 234 at no additional cost (as shown by the N/A entry in the PRICE ADDER column).

Alternatively, the customer 22, 24 may select a better carpet 240 also offered by the builder 26. As shown, the better carpet 240 may be offered at a price adder 242.

As a further alternative, the customer 22, 24 may choose to select a product offering of a customer wood floor 249 by another contractor 26 (J. Jones). In this case, a different price adder 251 would be included.

As shown in FIG. 13, selection of a carpet option is not complete by selection of the carpet by itself. Also necessary to complete a carpet selection is a color selection. If the customer 22, 24 were to select the first carpet selection 228, then the customer 22, 24 would have the choice of brown or blue. The customer 22, 24 would make such a selection by pressing the appropriate soft key 230, 232.

If the customer 22, 24 had selected carpet from the second supplier 234, then the customer 22, 24 may select other colors based upon other softkeys 236, 238. Similarly, if the customer 22, 24 where to select the optional carpet 240 at added cost, then he may select available colors by activation of related softkeys 244, 246.

If the customer 22, 24 were not happy with the standard options, the customer 22, 24 may activate hyperlinks 248, 250 to other suppliers (i.e., manufacturers 30) not associated with the builder 26. Purchase of carpet from the other suppliers through hyperlinks 248, 250 may be accomplished using methods well-known in the art.

In another alternative, the customer 22, 24 may choose to select a brand name 223 or stylistic group 224, before making other selections on screen 210. In this case, the manufacturer's of FIG. 13 may be limited to the selection made as opposed to the products preselected by the builder 26.

Figure 25:
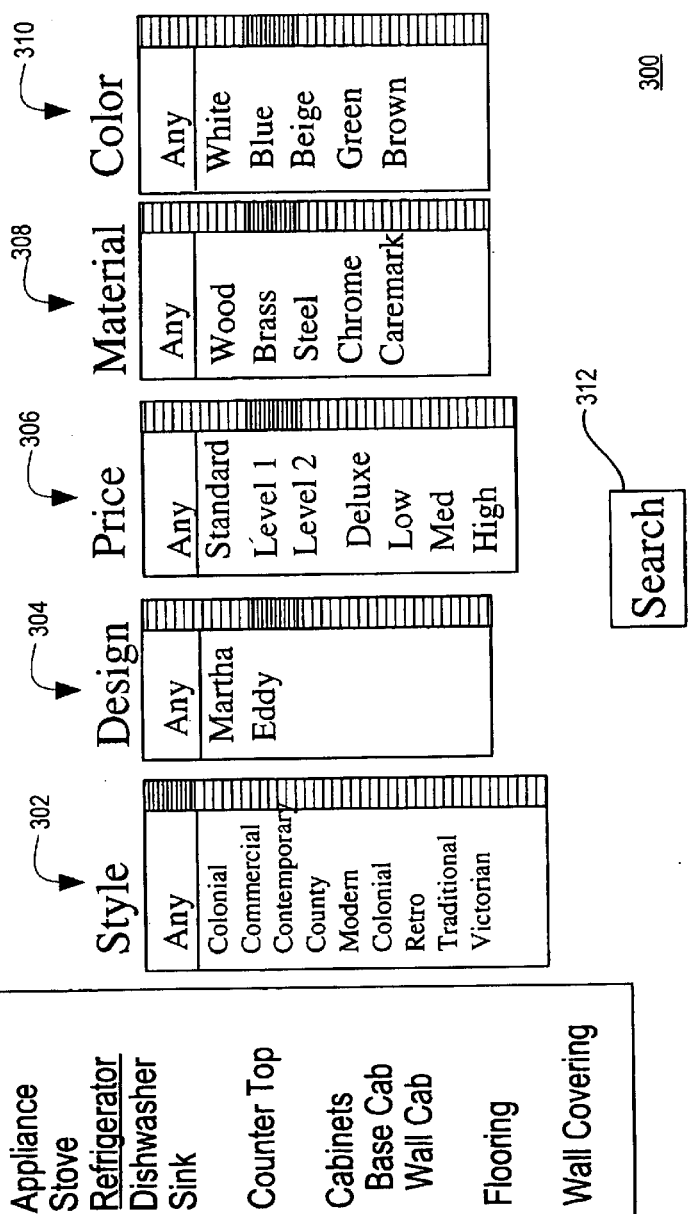
FIG. 25 depicts webpage witn an options list for a refrigerator that may be provided by the system of FIG. 1.
Figure 31:
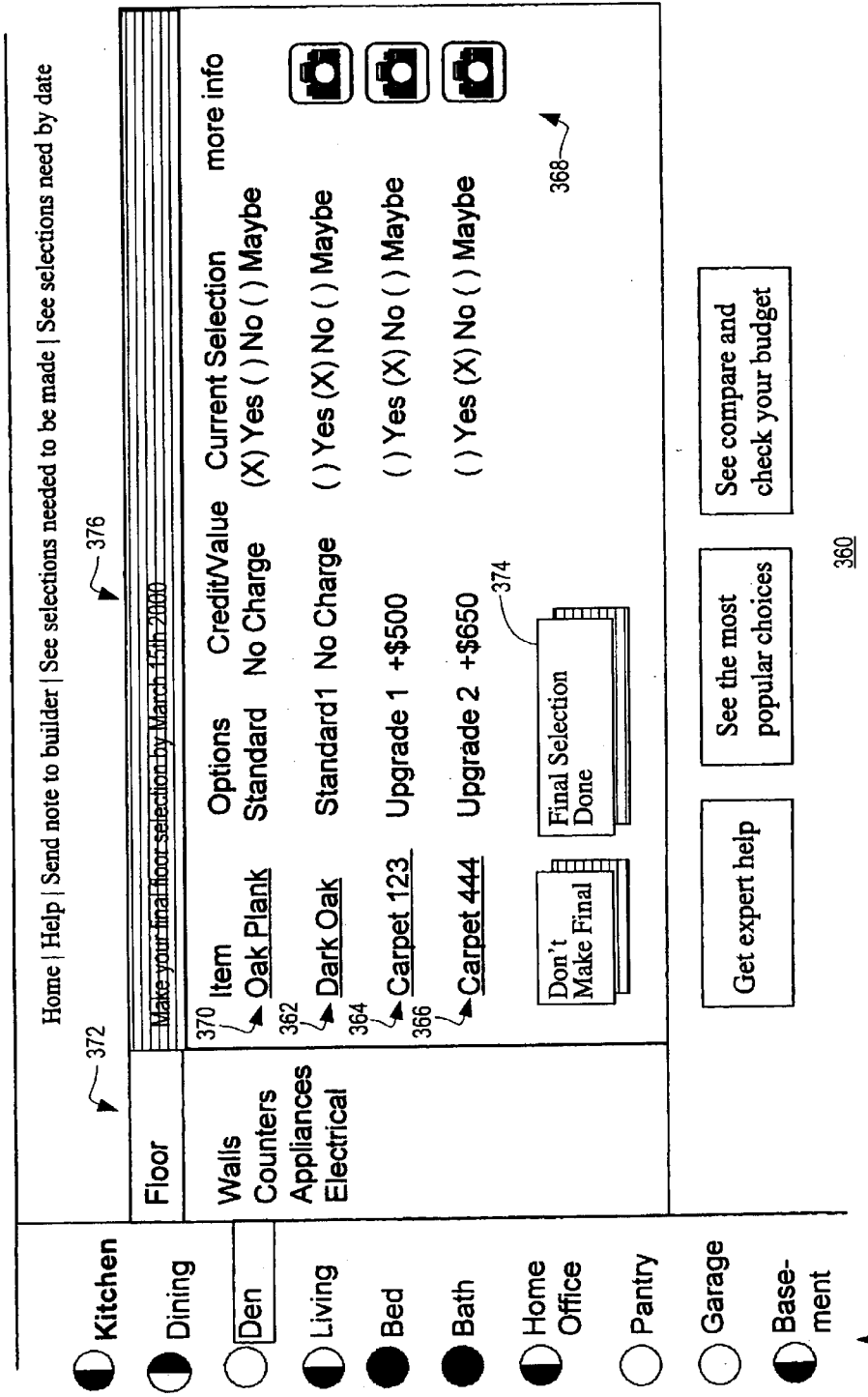
FIG. 31 depicts additional floor product options that may be downloaded through the webpage of FIG. 25.
Figure 32:
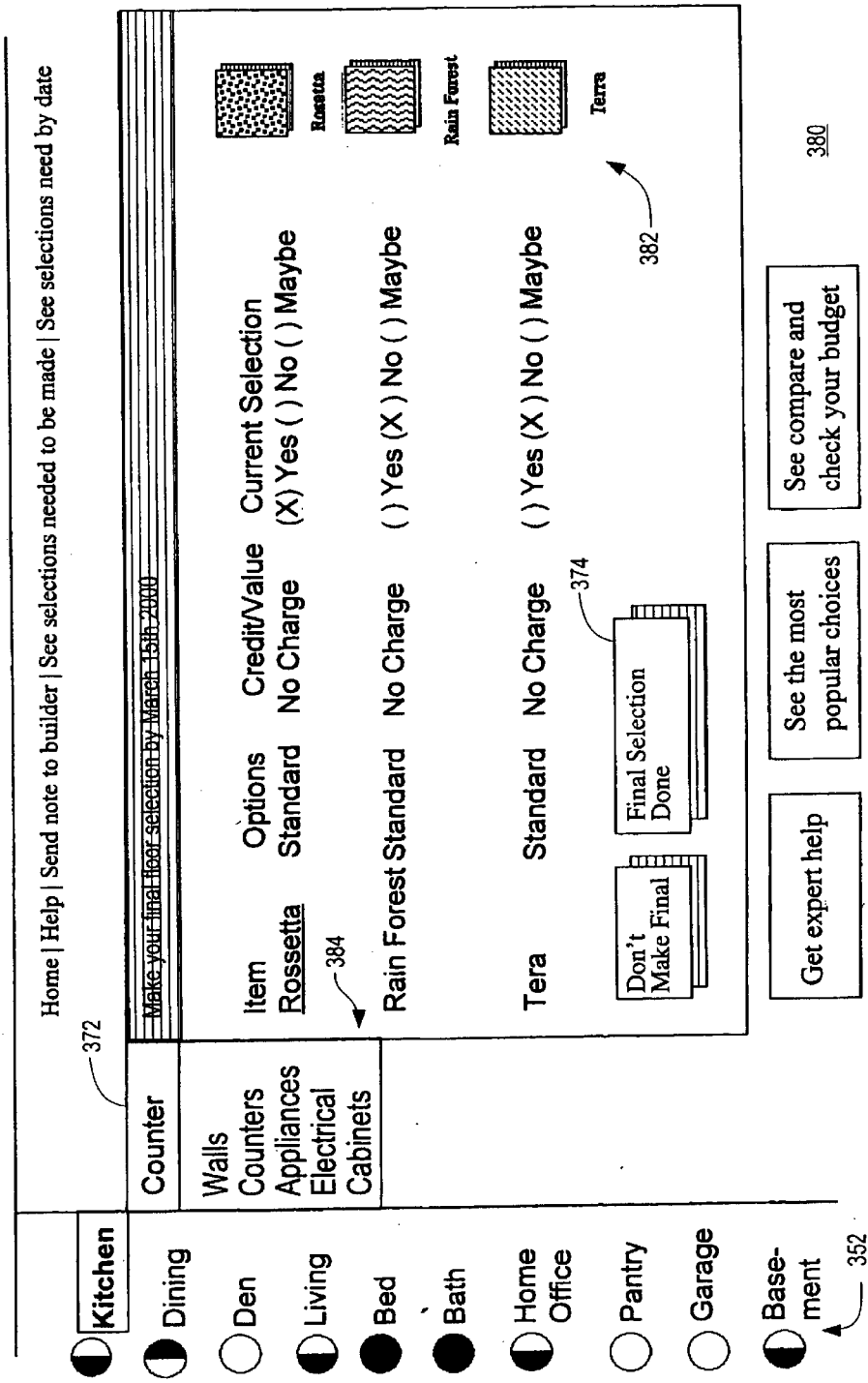
FIG. 32 depicts additional cabinet product options that may be downloaded through the webpage of FIG. 25.
Figure 34:
FIG. 34 depicts additional status information that may be downloaded through the webpage of FIG. 25.
Figure 35:
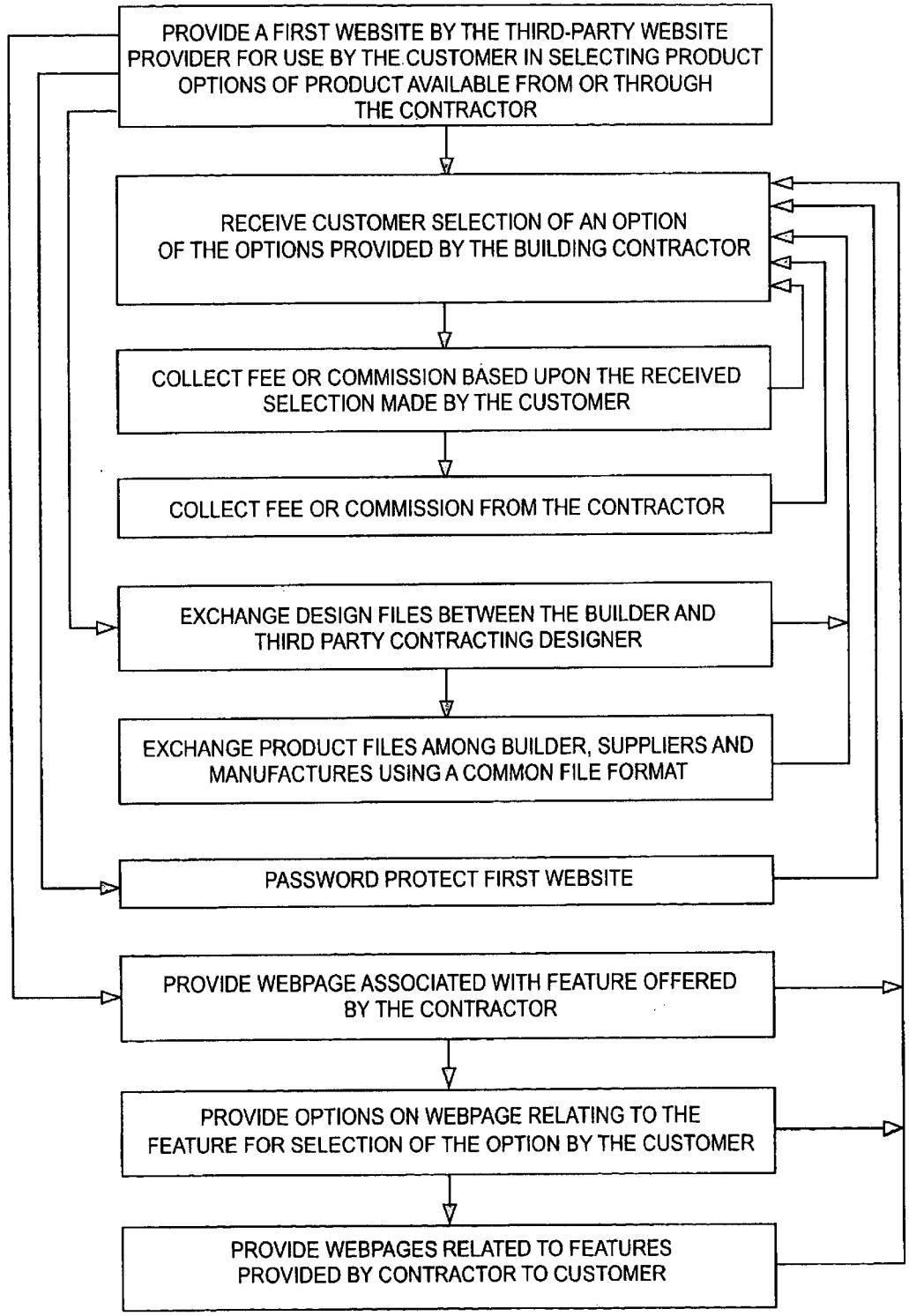
FIG. 35 depicts the method steps that may be provided by the system of FIG. 1.
Figure 36:
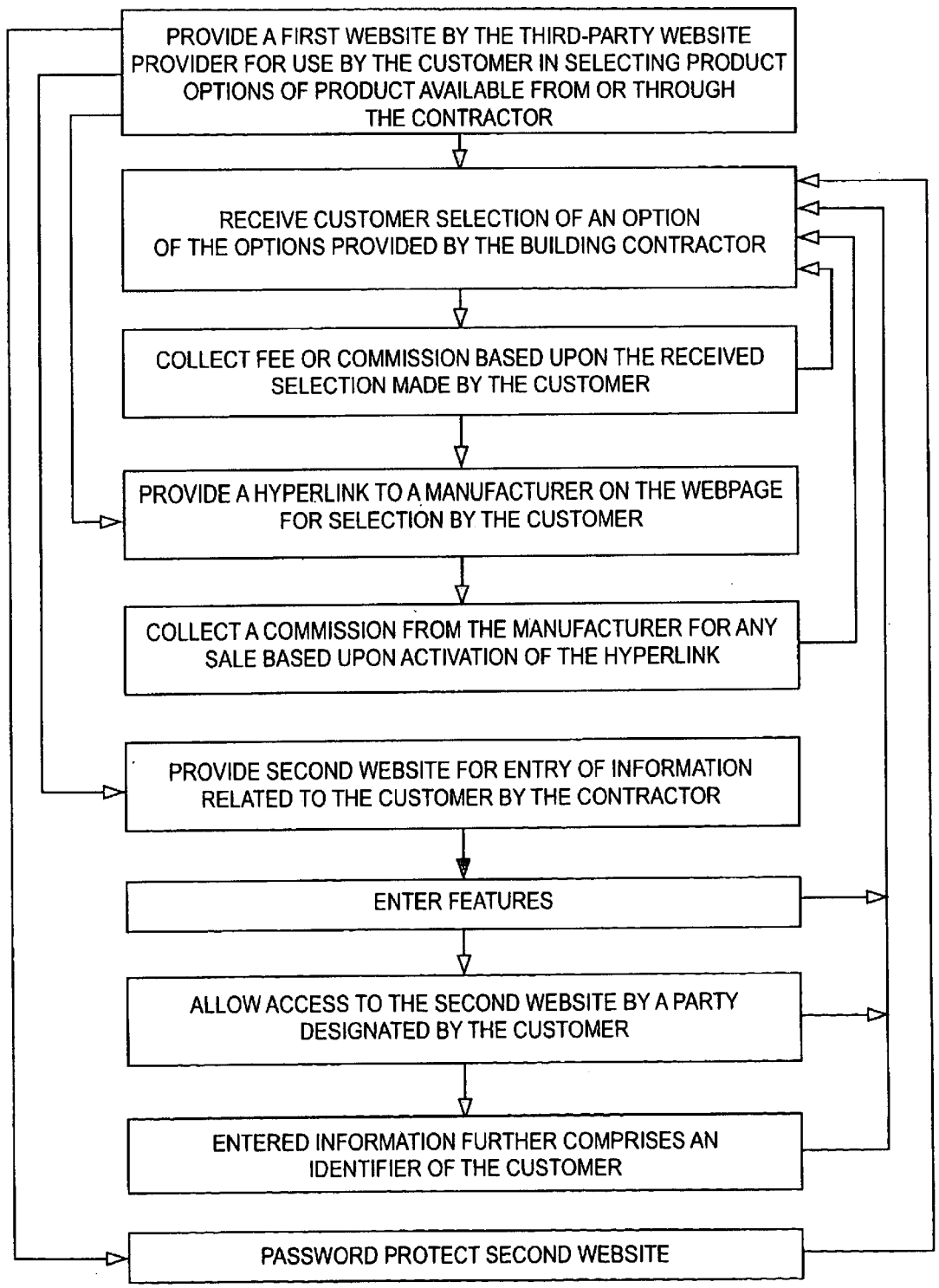
FIG. 36 depicts additional optional method steps that may be provided by the system of FIG. 1.
Figure 37:
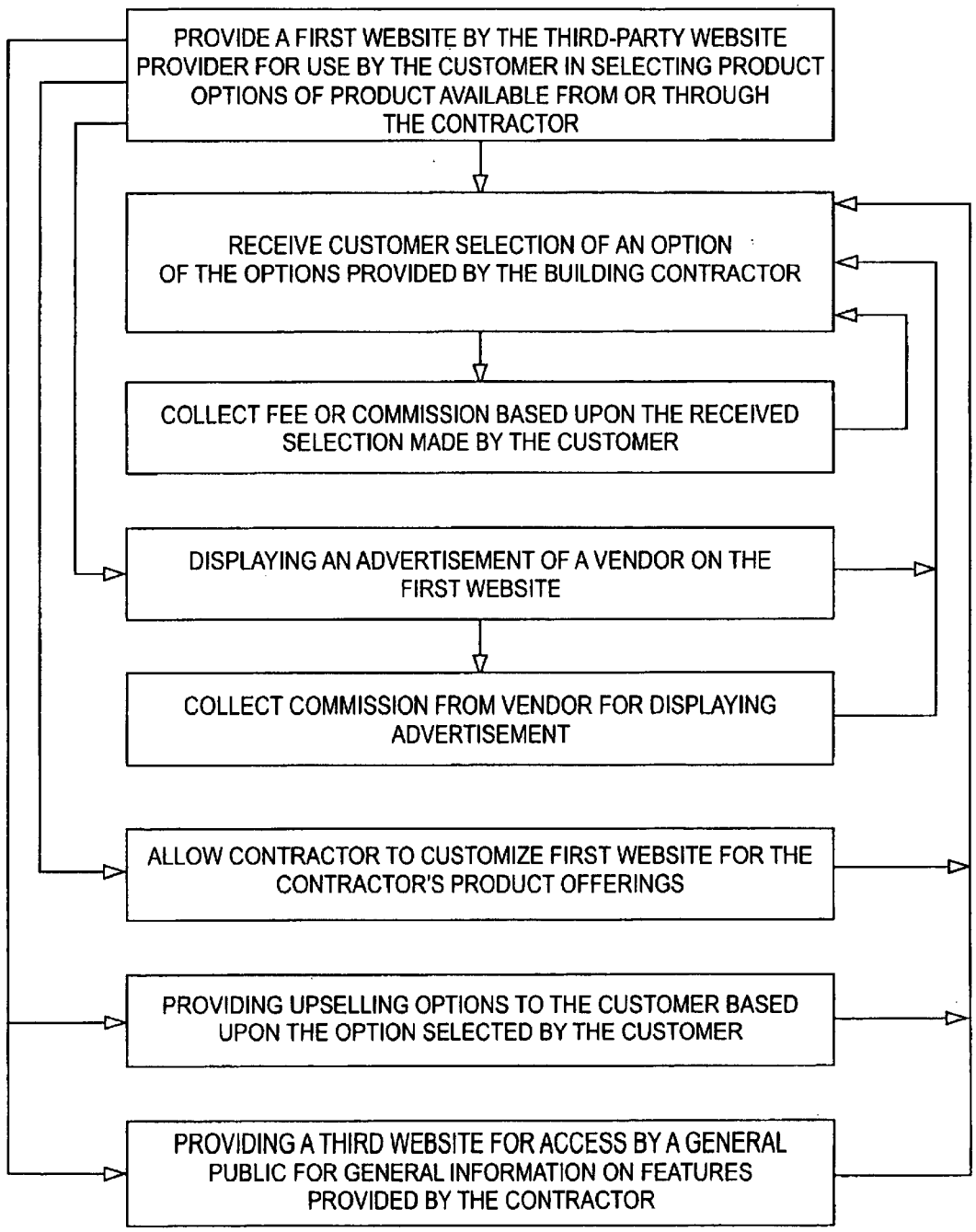
FIG. 37 depicts still further additional additional method steps that may be provided by the system of FIG. 1.

For example, the customer 22, 24 may first activate the selection of "refrigerator" from the appliances list of FIG. 12 and then brand 223 and/or stylistic group 224. In response, the screen 300 of FIG. 25 may be presented. Within the screen 300, the customer 22, 24 may specify a search criteria for a refrigerator. The customer 22, 24 specify a style criteria 302, a design 304, a price 306, a material 308 and/or color 310.

FIG. 26 shows a possible search criteria that may be selected by the customer 22, 24. Upon completion of the selection of the search criteria, the customer 22, 24 activates the search key 312.

Upon activation of the search key 312, the screen 320 (FIG. 27) may be presented showing search results. Shown in the screen 320 may be a number of product options as well as identifying information about those options. Shown along a top of the screen 320 is the search criteria returning those results. Upon reviewing the results, the customer 22, 24 may wish to see more information about the first search result. TO obtain more information, the customer 22, 24 may activate the "see more info" key 322.

Activating the more info key 322 may take the customer 22, 24 to the more info screen 330 (FIG. 28) which shows additional detail of the selected product. Upon reviewing the information, the customer 22, 24 may select the option by selecting "add to my cart" 326 or return to the previous screen by activating the search key 332.

As an alternative, one of the search results of screen 320 may have been a hyperlink 328 to the refrigerator manufacturer Sub-Zero. Activation of that hyperlink may take the customer to screen 340 (FIG. 29). From screen 340, the customer 22, 24 may view any of a number of Sub-Zero products by activation of the proper additional hyperlink.

Further, marketing research may indicate that buyers of a particular product or stylistic group (e.g., Martha Stewart) are more likely to purchase other related household items (e.g., baskets, floral patterns, etc.). Accordingly, selection of the identified products may also trigger a window asking the customer 22, 24 if he/she also wants to purchase the related item as part of an upselling opportunity.

In another alternative, the customer 22, 24 may activate an information softkey 221 and be taken to the screen 225 of FIG. 21. Screen 225 may be used by the customer 22, 24 for purposes of reviewing a current selection, other popular choices or a designer collection.

It should be understood that the CPU 12 of the system 12 tracks use of the hyperlinks 248, 250 and charges a commission on any purchases based upon the use of such hyperlinks 248, 250. Such commission may be charged to the hyperlink destination (e.g., the manufacturer 30) based upon any sale made by the manufacturer 30 to the customer 22, 24.

Returning now to FIG. 12, the customer 22, 24 may proceed through each of the standards and extras making selections as appropriate. If appliances 222 where included in the real estate contract, then the customer 22, 24 would be prompted to make a selection for each included appliance including make and color.

Once options were selected for the kitchen, the customer 22, 24 may return to the menu 180 in FIG. 11 and individually proceed through each selected item 182, 184, 186, 188, 190, 192, 194, 196, 198, 200, 202, 204 making required selections. While many items would require an explicit selection from the customer 22, 24, some items need not be explicitly chosen by the customer 22, 24. For example, wall color in the contract may have been negotiated to be an off-color white. In this case, the builder may omit paint color from the builder's features and options list transferred to the customer's file 42.

Once the customer 22, 24 has completed his selections from the features and options list, the customer 22, 24 may activate a selection complete softkey 206. Activation of the selection complete softkey 206 may cause the CPU 12 to compose an e-mail message to the builder 26 summarizing the selections made by the customer 22, 24. Alternatively, where the builder 26 and customer 22, 24, share passwords for the customer file 42, the builder 26 may simply retrieve the selections list directly from the customer file 42.

As an aid to completing the completion of the selection of options a number of reminder features are offered by the system 10. For example, during feature selection from appropriate portion of the showroom (e.g., screen 330, FIG. 28) the customer 22, 24 may review a selection status ledger.

To review the selection status ledger, the customer 22, 24 may activate a softkey of selections to be made 344 or selection deadlines 346. Upon activation of the selections to be made softkey 344, the customer 22, 24 may be taken to the screen 350 of FIG. 30.

Shown along the left margin of screen 350 is a graphical status indicator 352 of the selection status. The graphical status indicator 352 may be used as a shortcut into the showroom for unselected product offerings.

For example, the customer 22, 24 may note from the status ledger 350 that the den was not complete. In response, the customer 22, 24 may select the den 354 and be taken to screen 360.

On screen 360, the den may be highlighted in the left margin 352 as a current location. Further, an indicator 372 may be provided of the feature space to which the selection is to be directed. The screen 360 may also list three options 362, 364, 366, 370. An icon of a camera 368 may be selected for a pictorial view of each option. A selection date 376 may be provided as a deadline for making a selection for the den.

If the customer should select the first option 370 for oak plank for the floor, a current selection column will show an "x" in the "yes" column. The customer 22, 24 may complete the selection by activating the "final selection done" button 374.

Returning to the status ledger 350, the customer 22, 24 may then go to the kitchen to make other selections in this feature space. The customer 22, 24 may go to the kitchen by activating the kitchen icon 354 in the left margin.

In response, the customer 22, 24 may be taken the screen 380 which shows a feature space (e.g., a counter) 372 within which a selection needs to be made. In this case, the customer 22, 24 may activate the more information button to view images 382 of the options.

After making a selection with regard to the counters, the customer 22, 24 may select cabinets 384 for another set of options shown on screen 390 of FIG. 33. Within the cabinets screen 390 a set of images 392, 394, 396, 398, 400 may be provided of the possible cabinet choices are provided.

Once the customer 22, 24 has completed set of selections for the kitchen, the customer 22, 24 may activate the final selection done button 374. Upon activating a final selection button 374, the customer 22, 24 may be taken to a selections summary screen 410. Shown on the selections summary screen 410 is a list of current selections as well as a list 416 of the cost of any extras added during the current selection session for the kitchen.

Upon reviewing the list 416, the customer 22, 24 may return to selecting items by activating the see selections to made button 344 or see selections by date 346. Alternatively, the customer 22, 24 may send a list of selected items to the builder 26 by activating a message button 412.

Based upon the options list the CPU 12 may compose a number of e-mails to the suppliers 27, 28 of the builder 26 for purposes of placing orders for selected product. One e-mail may be to one or more appliance suppliers 27, 28 for selected appliances. Another e-mail may be a carpet supplier 27, 28. A third e-mail may be to a paint supplier. Another e-mail may be to a mechanical supplier 27, 28 for furnaces and air conditions. Included within each of these e-mails may be a request for an updated price quote as well as a lead time for delivery.

Based upon the response to the request for lead times, the builder 26 may adopt a construction schedule based upon a requested completion date 135 included in the real estate contract. As would be generally understood, a construction schedule is typically based upon a predetermined ordering sequence (e.g., a furnace would be required before paint, paint would be required before most appliances). Using the predetermined schedule, completion date 135 and lead times provided by the suppliers 27, 28, the CPU 12 would create a building schedule including ordering dates for each of the materials of each of the selected options.

Based upon the entries within the construction schedule, the CPU 12 may identify options which have not been made by the customer 22, 24. Upon identifying those selections not made by the customer, the CPU 12 may notify the builder 26 and customer 22, 24, by e-mail or otherwise of dates and acts necessary to conform to the construction schedule.

As an alternative to automatically forwarding orders to suppliers, the builder 26 may group orders for purposes of obtaining volume discounts. In order to group orders the builder 26 may also periodically print out the grouped orders and physically send the grouped order to a supplier 27, 28 or transmit the grouped orders by e-mail.

Using the builder's terminal 26, the builder may periodically review the construction schedule. Based upon the review, the builder 26 may send message to the customer 22, 24 reminding the customer 22, 24 of deadlines for making selections.

Under another alternate illustrated embodiment, a third website 18 may be provided for a broader array of customers. In this context, a customer may be the originally defined customers 22, 24 as well as the builder 26 or suppliers 27, 28. As each customer 22, 24, 26, 27, 28 accesses the website 18, the webpage 260 may be presented to the customer. Based upon the customer's needs any of a number of subject matter may be selected for purchase based upon activation of the appropriate softkey 262, 264, 266, 268, 270, 272, 274, 276.

Activation of a softkey (e.g., 262) may take the customer to a furnaces webpage 278 showing a number of furnace options. Information on special types of furnaces may be obtained by selection of the appropriate softkeys 280, 282. Information from specific manufactures may also be obtained by selecting a hyperlink 286, 288 which may take the customer to a website (e.g., 38) of the manufacturer.

Upon reaching the appropriate webpage, a customer may fill his shopping cart with selected merchandise. As used herein a "shopping cart" is simply file and information gathering and ordering software residing in a terminal of the customer 22, 24, 26, 27, 28 which retains product information of selected merchandise. Upon activation of a softkey on the shopping cart, the ordering software functions to transmit ordering information to the appropriate manufacturer or supplier.

As above, the owner of the system 12 may receive a commission on any purchases made based upon activation of a selected hyperlink. Further, the owner of the system 12 may receive commissions based upon advertising displayed on the webpages 278 of the product categories.

Under another alternate illustrated embodiment of the invention, a builder 26 and designer (e.g., supplier 27, 28) may use the builder's website 16 for designing and developing building drawings (e.g., a kitchen design). Under the embodiment, either party may propose and create a preliminary design concept using an appropriate graphics software package (e.g., Visio) and save the design in a design file. Once a design file has been created, it may be e-mailed to the other party. The other party, using the same graphics package may mark the file up or modify the design and e-mail the file back to the other party. Once both parties agree to the design, the builder 26 may convert the graphics file to a webpage using a simple graphics conversion process (e.g., printing out the Visio design file and scanning the printout to obtain a html graphics display that may be mounted on the builder's webpage 34). The new design may then become the basis of new or additional product offerings of the builder 26.

As a further embodiment of the invention, the designer may also develop and attach specification sheets to each design drawing of the Visio file. The specification sheets may be used to specify product(s)/product offerings to be used in the product spaces of the design.

Upon converting each design drawing to a html file for display on a webpage 34, the builder 26 may also associate one or more design spaces with each design drawing. Product(s)/product offerings from the specification sheets of the drawing may then be associated with each design space and incorporated into the features and options list for the design space.

Under another illustrated embodiment of the invention, file transfer among builders and suppliers and manufactures may be standardized to a common file format (e.g., XML). Under the embodiment, the file creator follows a predetermined format for creation of the file. For example, a product identifier may be placed in a first field. The product identifier may be one or more alphanumeric characters which identifies the product as a refrigerator or a bathroom faucet. The product identifier may also be used for product offerings.

An identifier of an originator may be placed in a second field. A product number (model number and serial number, if a manufacturer) may be placed in a third field. Any graphics associated with the product may be placed in further fields.

Under the embodiment, the receiver of such an XML file may be able to universally interpret the file based upon file content. The product type identifies the types of suppliers of such products. The identifer of the originator allows the recipient to then read local source files to determine the types of model number and serial numbers used by the originator, and, ultimately to interpret model and serial numbers included within the remainder of the XML file.

By using the common file format, builders 26, suppliers 27, 28 and manufactures 30, 31 may exchange information without advance knowledge of the source or format of the file. Orders and order confirmations may be exchanged without the intervention of ordering clerks or project schedulers.

A specific embodiment of a method and apparatus for servicing a customer of a builder according to the present invention has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention and any and all modifications, variations, or equivalents that fall within the true spirit and scope of the basic underlying principles disclosed and claimed herein.

What is claimed is:

1. A method of servicing a customer of a building contractor by a third-party website provider, such method comprising the steps of:

the customer and building contractor entering into a contract to build or rehabilitate real estate for the customer at a building site of the real estate, said entered contract forming a pre-existing contract;

providing a first website by the third-party website provider, said first website being password protected by a password of the customer, said website providing product, service or installation service options of product, service or installation service offerings available from or through the building contractor for installation at the building site under the pre-existing contract to build or rehabilitate the real estate for the customer;

providing a second website associated with the first website by the third-party website provider for entry of information related to the customer by the contractor, said second website being password protected by a password of the contractor;

receiving from the customer through the first website a selection of an option of the options provided by the building contractor associated with the pre-existing contract; and collecting a fee or commission based upon the received selection made by the customer.

2. The method of servicing the customer of the contractor as in claim 1 wherein the step of collecting the fee or commission based upon the selection made by the customer further comprises collecting the fee or commission from the contractor.

3. The method of servicing the customer of the contractor as in claim 1 wherein the step of providing the first website further comprises providing a webpage associated with a feature offered by the contractor.

4. The method of servicing the customer of the contractor as in claim 3 wherein the step of providing the webpage further comprises providing a plurality of options on the webpage relating to the feature for selection of the option by the customer.

5. The method of servicing the customer of the contractor as in claim 4 further comprising providing a plurality of webpages each related to a feature provided by the contractor to the customer.

6. The method of servicing the customer of the contractor as in claim 3 further comprising providing a hyperlink to a manufacturer on the webpage for selection by the customer.

7. The method of servicing the customer of the contractor as in claim 6 wherein the step of providing the hyperlink further comprises collecting a commission from the manufacturer for any sale based upon activation of the hyperlink.

8. The method of servicing the customer of the contractor as in claim 1 wherein the entered information further comprises features.

9. The method of servicing the customer of the contractor as in claim 1 wherein the step of providing the second website further comprises allowing access to the second website by a party designated by the customer.

10. The method of servicing the customer of the contractor as in claim 1 wherein the entered information further comprises an identifier of the customer.

11. The method of servicing the customer of the contractor as in claim 1 further comprising password protecting the second website.

12. The method of servicing the customer of the contractor as in claim 1 further comprising displaying an advertisement of a vendor on the first website.

13. The method of servicing the customer of the contractor as in claim 12 further comprising collecting a commission from the vendor for displaying the advertisement.

14. The method of servicing the customer of the contractor as in claim 12 further comprising allowing the contractor to customize the first website for the contractor's product offerings.

15. The method of servicing the customer of the contractor as in claim 12 further comprising providing upselling options to the customer based upon the option selected by the customer.

16. The method of servicing the customer of the building contractor as in claim 1 further comprising providing a third website for access by a general public for general information on features, where such features further comprise products or fixtures to be installed on-site, building contractor services, labor or installation provided by the building contractor through the third party website.

17. The method of servicing the customer of the building contractor as in claim 1 further comprising exchanging product, service, labor, installation or design files between the builder and a third party contracting designer to create the provided product options that are offered to the customer through the first website.

18. The method of servicing the customer of the contractor as in claim 1 further comprising exchanging product files among the builder, suppliers and manufactures using a common file format.

19. An apparatus for servicing a customer of a building contractor by a third-party website provider, such apparatus comprising:

"contract" a contract between the customer and the building contractor to build or rehabilitate real estate for the customer at a building site of the real estate, said contract forming a pre-existing agreement;

means for providing a first website by the third-party website provider, said first website being password protected by a password of the customer, said website providing product, service or installation service options of product, service or installation service offerings available from the building contractor for installation into a product space at the building site under the pre-existing contract to build or rehabilitate the real estate between the building contractor and the customer;

means for providing a second website associated with the first website by the third-party website provider for entry of information related to the customer by the contractor, said second website being password protected by a password of the contractor;

means for receiving from the customer through the first website a selection of an option of the options provided by the building contractor associated with the pre-existing contract;

means for collecting a commission based upon the received selection made by the customers; and 20. The apparatus for servicing the customer of the contractor as in claim 19 wherein the means for collecting the commission based upon the selection made by the customer further comprises means for collecting the commission from the contractor.

21. The apparatus for servicing the customer of the contractor as in claim 19 wherein the means for providing the first website further comprises means for providing a webpage associated with a feature offered by the contractor.

22. The apparatus for servicing the customer of the contractor as in claim 21 wherein the means for providing the webpage further comprises means for providing a plurality of options on the webpage relating to the feature for selection of the option by the customer.

23. The apparatus for servicing the customer of the contractor as in claim 22 further comprising means for providing a plurality of webpages each related to a feature provided by the contractor to the customer.

24. The apparatus for servicing the customer of the contractor as in claim 21 further comprising means for providing a hyperlink to a manufacturer on the webpage for selection by the customer.

25. The apparatus for servicing the customer of the contractor as in claim 24 wherein the means for providing the hyperlink further comprises means for collecting a commission from the manufacturer for any sale based upon activation of the hyperlink.

26. The apparatus for servicing the customer of the contractor as in claim 19 wherein the entered information further comprises features.

27. The apparatus for servicing the customer of the contractor as in claim 19 wherein the entered information further comprises an identifier of the customer.

28. The apparatus for servicing the customer of the contractor as in claim 19 further comprising means for password protecting the second website.

29. The apparatus for servicing the customer of the contractor as in claim 19 further comprising means for providing a third website for access by a general public for general information on features provided by the contractor.

30. An apparatus for servicing a customer of a building contractor by a third-party website provider, such apparatus comprising:

of a contract between the customer and the building contractor to build or rehabilitate real estate for the customer at a building site of the real estate, said contract forming a pre-existing contract;

a first website provided by the third-party website provider, said first website being password protected by a password of the customer, said website providing product, service or installation service options of product, service or installation service offerings available from the building contractor for installation at the building site into the building or rehabilitation of the real estate by the building contractor for the customer under the pre-existing contract;

a second website associated with the first website provided by the third-party website provider for entry of information related to the customer by the contractor, said second website being password protected by a password of the contractor;

a selection processor receiving from the customer through the first website a selection of an option of the options provided by the building contractor associated with the pre-existing contract;

a commission processor adapted to collect a commission based upon the received selection made by the customer; and a contract term change processor for altering the terms of the preexisting contract based on said product, sevice, or installation options selected by the customer.

31. The apparatus for servicing the customer of the contractor as in claim 30 wherein the first website further comprises a webpage adapted to provide a feature offered by the contractor.

32. The apparatus for servicing the customer of the contractor as in claim 31 further comprising a plurality of webpages adapted to provide a plurality of features provided by the contractor to the customer.

33. The apparatus for servicing the customer of the contractor as in claim 30 further comprising a hyperlink to a manufacturer on the webpage for selection by the customer.

34. The method of servicing the customer as in claim 1 wherein the product, service or installation service offerings further comprise fixtures to be delivered for installation or installed within the building or renovation of the real estate by the building contractor for the customer.

35. The apparatus for servicing the customer as in claim 19 wherein the product, service or installation service offerings further comprise fixtures to be installed within the building or renovation of the real estate by the building contractor for the customer.

36. The apparatus for servicing the customer as in claim 30 wherein the product, service or installation service offerings further comprise fixtures to be installed within the building or renovation of the real estate by the building contractor for the customer.

37. The apparatus for servicing the customer as in claim 30 further comprising providing a virtual showroom that displays product offerings to the customer by the third-party website provider.

* * * * *

UNITED STATES PATENT AND TRADEMARK OFFICE
CERTIFICATE OF CORRECTION

| | | |
|---|---|---|
| PATENT NO. | : 7,076,455 B1 | Page 1 of 1 |
| APPLICATION NO. | : 09/483579 | |
| DATED | : July 11, 2006 | |
| INVENTOR(S) | : Bruce A. Fogelson | |

It is certified that error appears in the above-identified patent and that said Letters Patent is hereby corrected as shown below:

In Col. 16, line 29, claim 19, line 4, replace "contract" with --means for establishing the terms of--.
In Col. 16, line 53, claim 19, line 25, delete "and".
In Col. 16, line 59, claim 21, line 27, replace "customer" with --customer; and--.
In Col. 16, claim 19, insert --means for altering the terms of the preexisting contract based on said product, service, or installation options selected by the customer.--
In Col. 17, line 29, claim 30, line 4, replace "of" with --a contract term establishment processor establishing terms of-- before "a contract".
In Col. 18, line 9, claim 30, line 25, delete "and".
In line 12, claim 30, line 27, replace "customer" with --customer; and--.

Signed and Sealed this

Twenty-ninth Day of April, 2008

JON W. DUDAS
*Director of the United States Patent and Trademark Office*